April 22, 1969 R. S. CARTER 3,440,615

OVERLAPPING BOUNDARY STORAGE

Filed Aug. 22, 1966 Sheet 1 of 13

INVENTOR
RICHARD S. CARTER

BY Melvin P. Williams
ATTORNEY

April 22, 1969 R. S. CARTER 3,440,615

OVERLAPPING BOUNDARY STORAGE

Filed Aug. 22, 1966 Sheet 2 of 13

BASIC EMBODIMENT ADDRESSING EXAMPLE

BASIC STORAGE ARRANGEMENT

BASIC EXAMPLE:
FIRST ADDRESS IS FOR BYTE 3 OF WORD 16,042

SUMMARY TABLE OF SHIFTING

| CONDITIONS | | SHIFT | | | |
|---|---|---|---|---|---|
| | | BASIC | | ADJUSTED | |
| ADR | SCAN | EVEN STG | ODD STG | EVEN STG (STAYS THE SAME) | ODD STG |
| E | + | NO | NO | NO | +S |
| 0 | − | NO | NO | NO | +S |
| E | − | NO | −S | NO | NO |
| 0 | + | +S | NO | +S | +S |

BASIC EXAMPLE: BYTE 3 OF WORD 16,042

PLUS SCAN

MINUS SCAN

ADJUSTED STORAGE ARRANGEMENT

ADJUSTED EXAMPLE:
BYTE 2 OF WORD 16,042

ADJUSTED EXAMPLE: BYTE 2 OF WORD 16,042

PLUS SCAN

MINUS SCAN

April 22, 1969 R. S. CARTER 3,440,615

OVERLAPPING BOUNDARY STORAGE

Filed Aug. 22, 1966 Sheet 10 of 13

United States Patent Office 3,440,615
Patented Apr. 22, 1969

3,440,615
OVERLAPPING BOUNDARY STORAGE
Richard S. Carter, Poughkeepsie, N.Y., assignor to International Business Machines Corporation, Armonk, N.Y., a corporation of New York
Filed Aug. 22, 1966, Ser. No. 574,210
Int. Cl. G11b *13/00*
U.S. Cl. 340—172.5 18 Claims

ABSTRACT OF THE DISCLOSURE

Disclosed is a method and apparatus for use in a data processing system utilizing a plurality of storage units having physically fixed storage location boundaries. The system includes at least two independently operable storage units which are independently addressable. Addresses are sequentially located in the storage units so that, for an exemplary system having two such storage units, even addresses are found in one unit and odd addresses are found in the other. For operations such as VFL (variable field length) requiring accessing of a plurality of sequentially located storage words, the method and apparatus operate to access from the addressed storage unit the currently addressed word and also to access the next-in-sequence word from the other storage device. In this manner, each addressing by the system in fact accesses the addressed location and also an overlap location where the overlap location is the next required location in the addressing sequence. The overlap location accessed along with the current address location is the next address in the sequence whether the system is operating in a positive or a negative scan of addresses, that is, whether increasing addresses or decreasing addresses, respectively, comprise the sequence. Of course, if more than two storage units are employed, more than one overlap location may be accessed in each cycle along with the currently addressed location.

This invention relates to data processing and more particularly to improved storage apparatus for use in a data processing system utilizing storage apparatus having physically fixed storage location boundaries.

In the data processing art, two general types of computer systems are known: one of these is a highly parallel, binary, fixed word-length, chiefly scientific type of machine; the other of these is a serial (or partially serial), decimal, randomly-addressed, variable word-length (with serialized data flow), chiefly commercial type of machine. Because of the variety of applications to which computers may be put in either business or academic environments, it is becoming more prevelant to provide combination machines which may have many of the characteristics of both of the before-described types.

A specific example of one prior art computer system includes the use of a fixed word length data flow which has, as an adjunct thereto, capability of controlling the data flow so as to perform digit by digit, randomly-addressed operations, which are typical of variable field length (VFL), commercial-type operations. In a large scale, highly parallel system, a buffer register is loaded with a number of small data words, or bytes, and these bytes are selected, one at a time, for processing, the results being returned to the buffer register for ultimate transfer to a storage device. An additional register may be provided so as to permit accessing a storage word in advance of the time at which it will be required for replenishing the buffer register; this may be called overlapped, or look-ahead operation. Systems of this type require a large amount of registering apparatus, and further require a complex timing arrangement so as to sort out the flow of data to and from a storage unit, as well as to keep track of the different bytes (such as digits or other small data words) which are being extracted from the buffer for processing. If a system has a very large, fixed-word data flow system (for instance 64 bits, which may be considered to be sixteen 4-bit digits or eight 8-bit alphameric characters), then a larger number of variable field length cycles may be made upon a buffer register of that size than would be true in the machine having only a 16-bit data flow. On the other hand, a large data flow is very expensive, and much more hardware is idle during the variable field length operations which, because of their typically serial nature, consume a great deal of time in contrast with parallel processing of the same amount of data in a fixed word length, parallel operation.

When the variable field length operations can proceed in either a positive direction through the addressable storage locations (hereinafter referred to as "plus scan") or in a negative direction through successively lower addressed locations (hereinafter referred to as "minus scan"), and when there are no boundaries or limitations placed on the actual storage location of the first digit (or other group) to be processed, then it frequently happens that the first storage word (even if it may contain 16 digits) has only one digit which is useful to the present operation due to the fact that the addressed digit is adjacent to a physical boundary of the storage word which is accessed. Even if the size of the fixed storage words were doubled, there would still be the possibility of a particular addressed digit being the last (or near the last) digit of the storage word. This means that valuable time is lost in producing a large number of data bits, relatively few of which are useful. The problem is further compounded through the fact that, in other than simple data moving operations, each digit is to be combined with another digit, and usually, these digits come from different storage locations. Thus the problems with one digit are also present in accessing the other digit, which means one digit buffer may need replacing in a first cycle and the other digit buffer may require replacing either one cycle or five cycles or some other number of cycles later. This further compounds the problem of maintaining buffers full of variable field length data.

In some prior VFL devices, strictly serial by-character operations are provided due to the inability to ensure that any given number of digits (or other groups) are available to utilize a larger data flow; in various-sized models of one particular system, since addressing is possible to the 8-bit byte level, an 8-bit data flow is provided for VFL operations. However, in certain models of that system, this results in a large amount of hardware being idle large periods of time while VFL operations are being performed. But, to provide parallel VFL operations in such a system would require such a complexity of buffering as to render it currently economically unfeasible to produce the necessary hardware within the system, particularly in the light of the fact that such hardware is itself used only a part of the time (during VFL operations, and not in fixed-word operations).

In another prior system, although five data groups might be presented for processing, they are actually passed through an arithmetic and logic unit one group at a time, each buffer being replenished just before becoming empty so that there is a continuous flow of groups of data bits to the arithmetic and logic unit. Again, serializing of the operations within the arithmetic and logic unit has reduced the speed of these devices. The provision of a data flow that would guarantee to handle five data groups in such a case would require a data flow, and a complete arithmetic and logic unit (including a complete adder, for instance), which can accommodate ten data groups, instead of one data group, in order to handle five data groups at one time, without regard to the starting and ending addresses, and the direction of scanning through storage, which a particular problem presented.

It is accordingly the primary object of the present invention to provide improved storage apparatus for mitigating the problems of handling variations in starting addresses, where the addressable groups comprise less than the fixed, physical boundary of the accompanying storage devices.

Other objects of the present invention include:

Provision of a physically unbounded storage apparatus for a data processing system;

Provision of a storage system suitable for use in variable field length operations, without regard to the serial or parallel nature of the utilization circuitry;

Provision of a storage apparatus wherein the storage words are of a given size and wherein the storage apparatus operates in such a fashion as to guarantee a given number of data bits to a data flow, without regard to the relative size of the data flow, or the particular addresses of the operands involved in the operations;

Provision of improved, randomly-addressed, variable word length data processing systems;

Provision of improved storage apparatus for use in randomly-addressed variable field length data processing systems, and exemplary data flow for utilization therewith;

Provision of storage apparatus for improved parallel processing of variable field length operands.

In accordance with a first embodiment of the present invention, a given storage apparatus may be considered (for illustrative purposes) to be replaced by two complete storage devices, each storage device being one-half the size of the given storage device (as is well known in the art). This provides two completely-independently operable storage units, each of which may respond to different addresses, the total number of data bits provided by both storage devices thereby achieving freedom from physical storage boundary conditions, in accordance with the invention herein. More specifically, a pair (or a plurality of pairs) of storage devices are simultaneously driven in response to any address, the stated address controlling the storage device within which the storage location relating to such stated address is found, the other storage device being driven by an address which is generated so as to have a relation to the stated address which depends upon operating conditions extant within the system at the time that the two storage devices are being accessed. Specifically, even addresses are found in one of the pair of storage devices, and all odd addresses are found in the other of the pair of storage devices (similarly for additional pairs of devices in larger systems). If a plurality of storage words is to be provided by a storage system in a plus scan (starting at a low address and going to a higher address), the storage word relating to the given address is accessed with the next higher storage word (which is found in the other storage device) also being accessed, automatically, at the same time. This provides two storage words which are known to contain the data group of a storage location at the given address, and at least as many more related data groups as there are data groups in each storage word. Thus, if there are four groups in a word, and the second group of an even-addressed word is specified, the system in accordance with the present invention will guarantee to provide the second group of the addressed word and three additional groups, making a total of four groups which are known to relate to each other, for utilization by the system. This operation is described in further detail with respect to this specific embodiment, hereinafter.

A second embodiment utilizes interleaved, double-word selection in a single storage unit, as described in the final paragraphs herein.

This invention not only permits performing variable field length operations in nominally fixed-word length machines, but also permits providing inherently better and faster variable field length machines, and economical variable field length machines of a parallel type. These advantages make it more economically feasible to provide growth machines for existing, partially serialized commercial type data processing systems, and permit the provision of related families of systems, the smaller ones of which have smaller data flows, and the larger ones of which are capable of handling small data flow type jobs with a large data flow setup. In summation, the present invention overcomes one of the computer design limitations which has severely hampered the development of computers for many years: fixed physical boundaries inherent in main storage systems.

Other objects, features, and advantages of the present invention will become more apparent in the light of the following detailed description thereof, as illustrated in the drawings.

Figure 1:
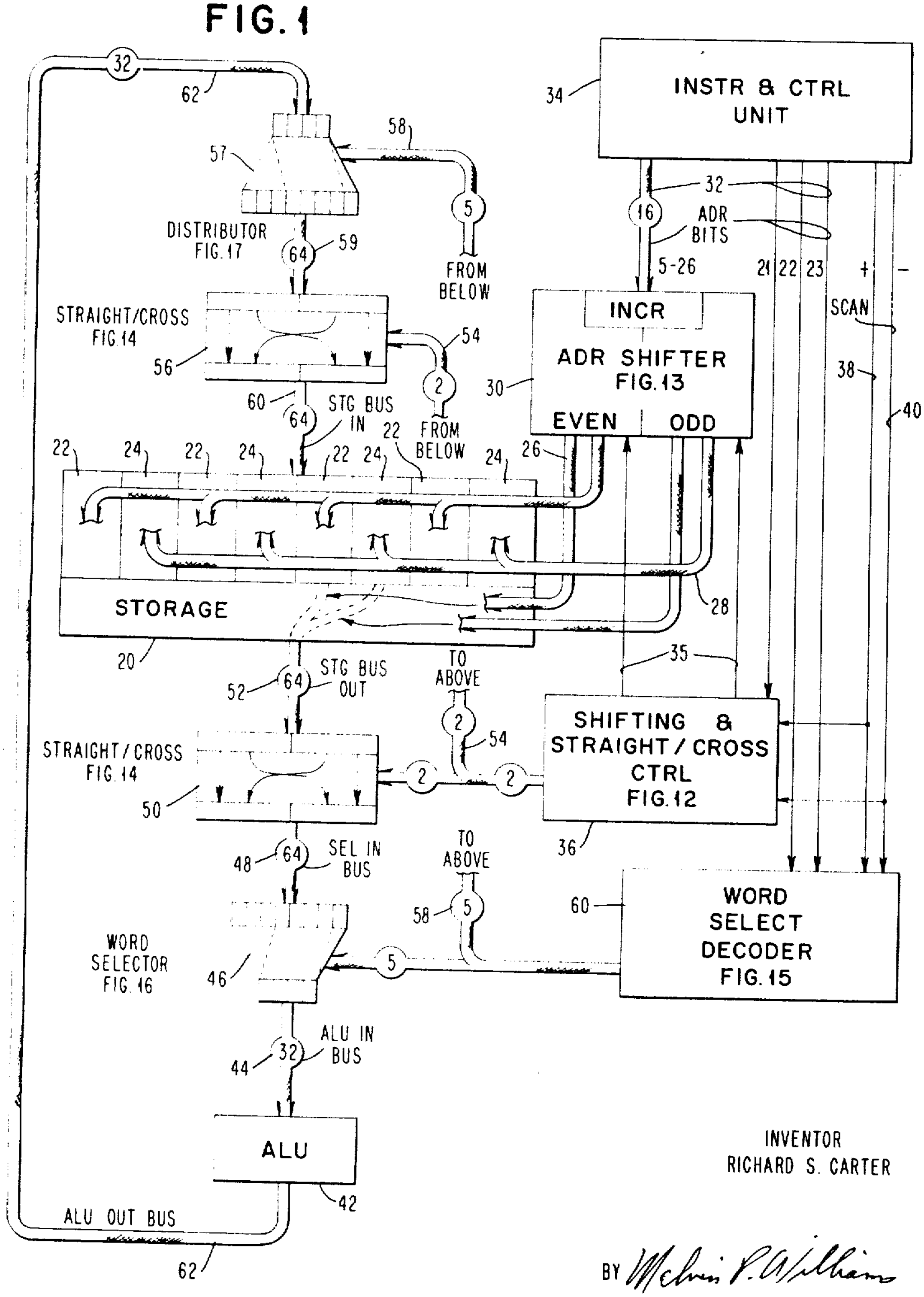
FIG. 1 is a simplified, schematic block diagram of an exemplary data processing system including the unbounded fixed-word length storage apparatus in accordance with the present invention.
Figure 5:
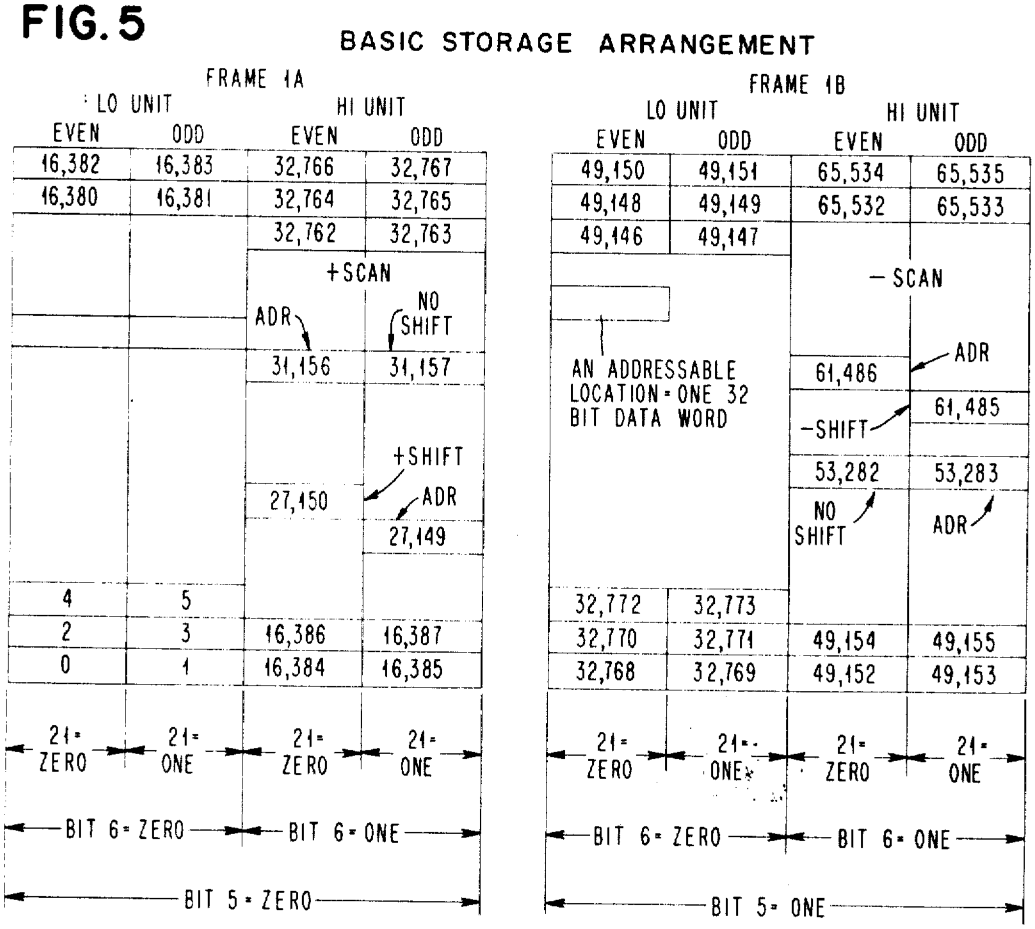
FIG. 5 is an illustration of the storage location arrangements within the storage unit referred to in FIG. 4.
Figures 6, 7:
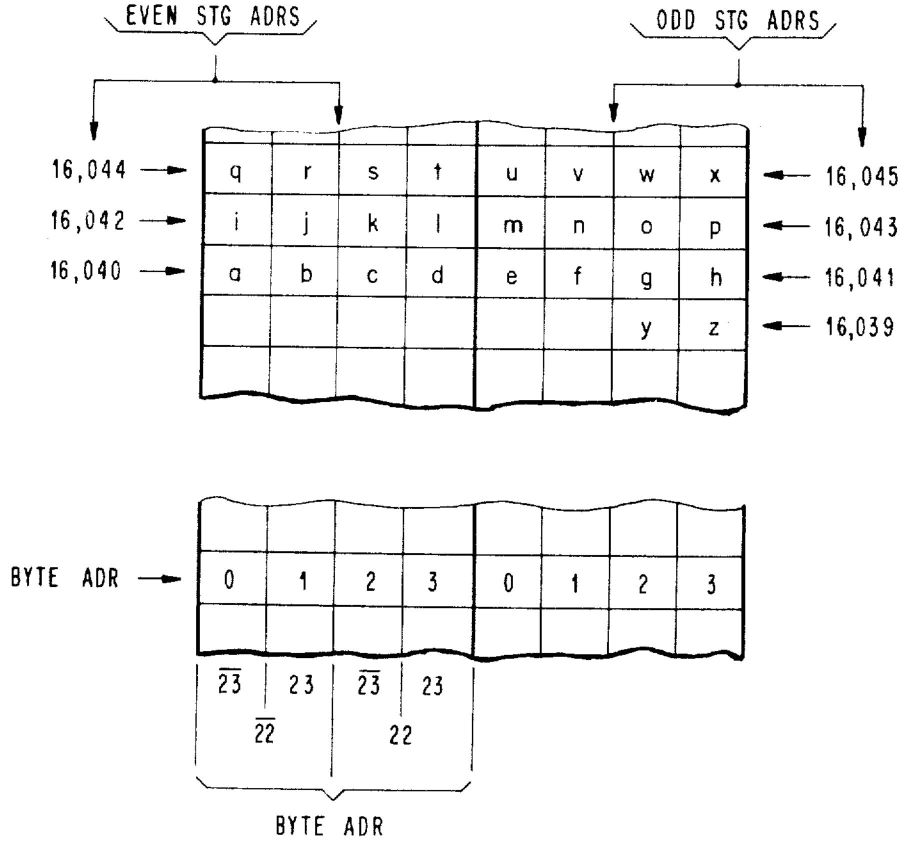
FIG. 6 is a chart illustrating exemplary contents of a portion of a pair of storage units of the type described in FIG. 5.
FIG. 7 is a summary table of operations relating to the storage locations described in FIGS. 5 and 6, in accordance with operation which is illustrated in FIG. 8.
Figure 9:
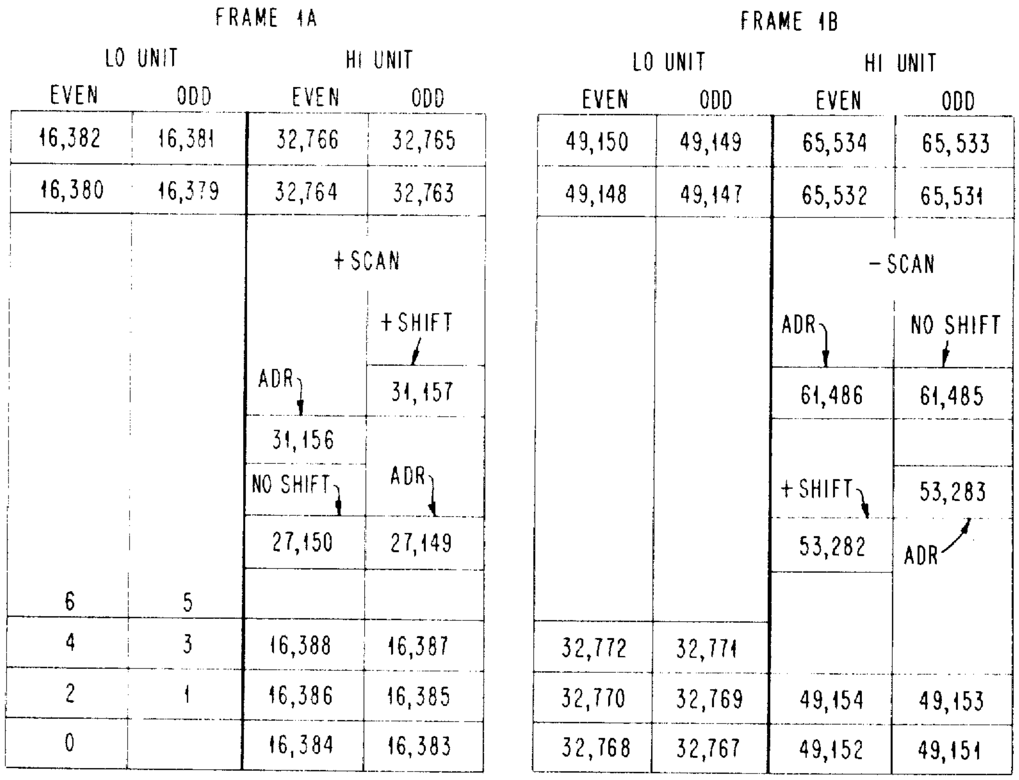
Figure 10:
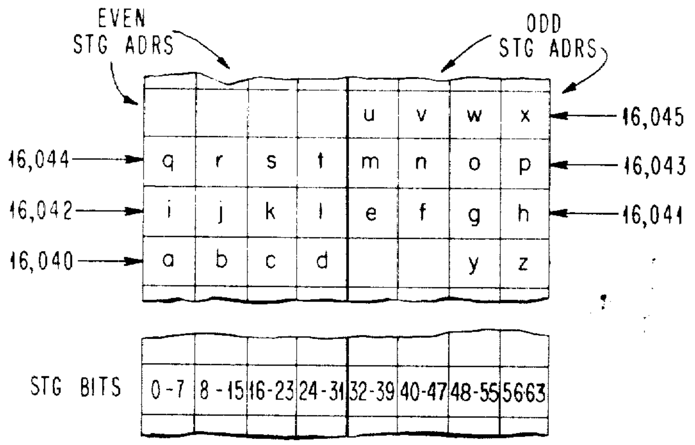
Figure 12:
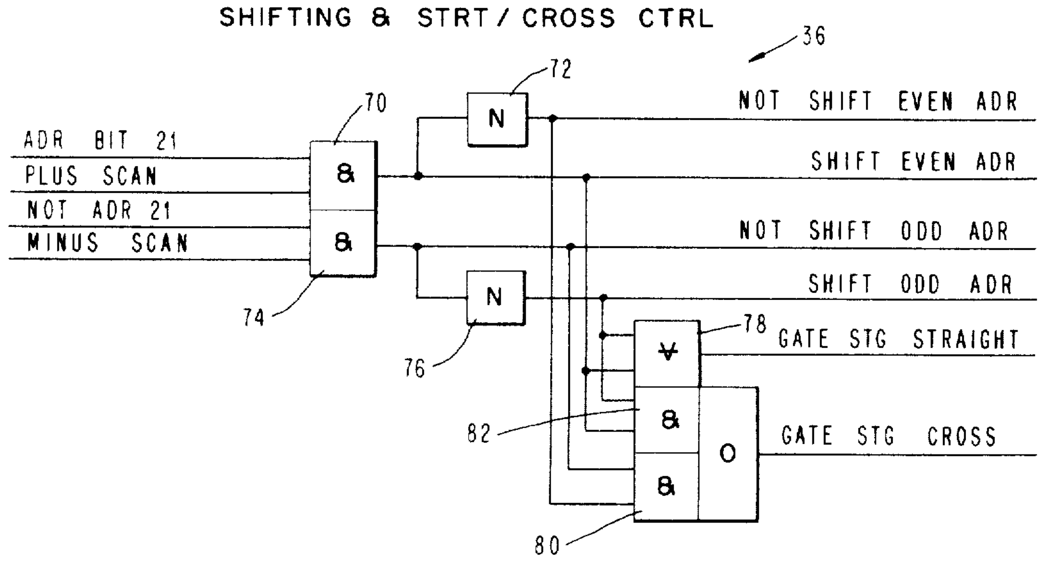
Figure 15:
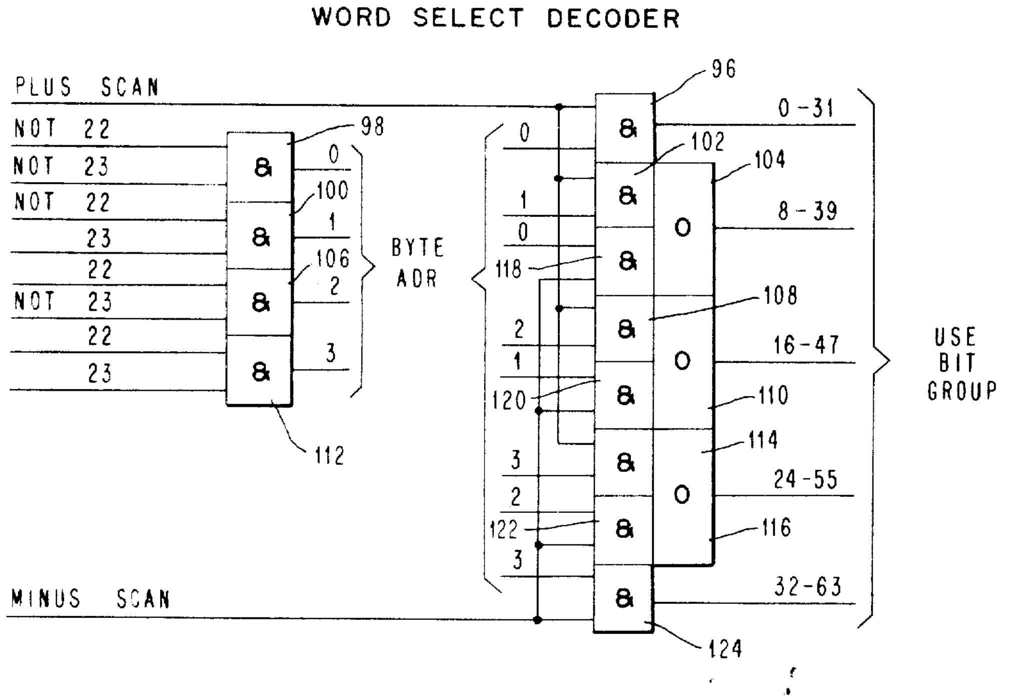
Figure 13:
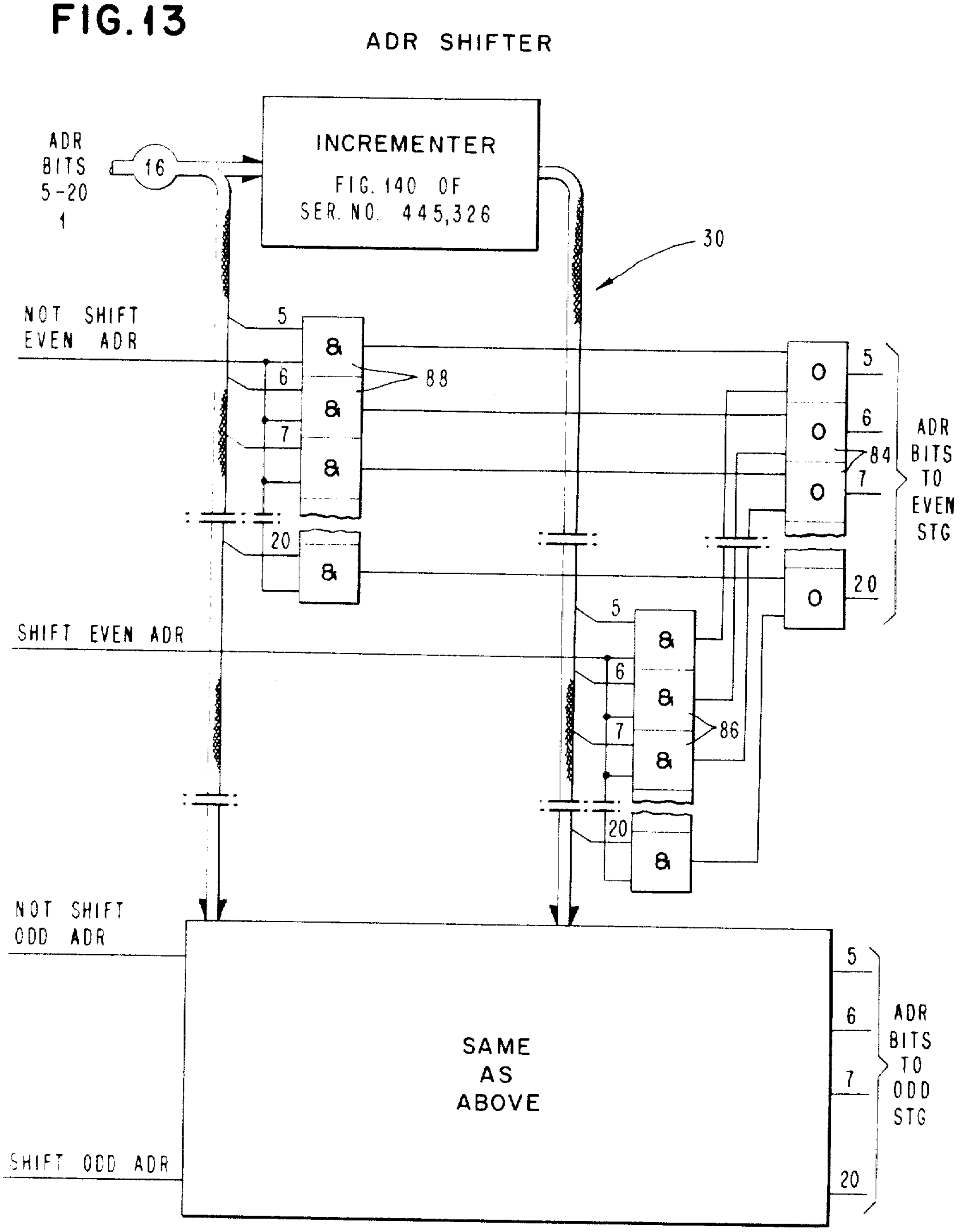
Figure 14:
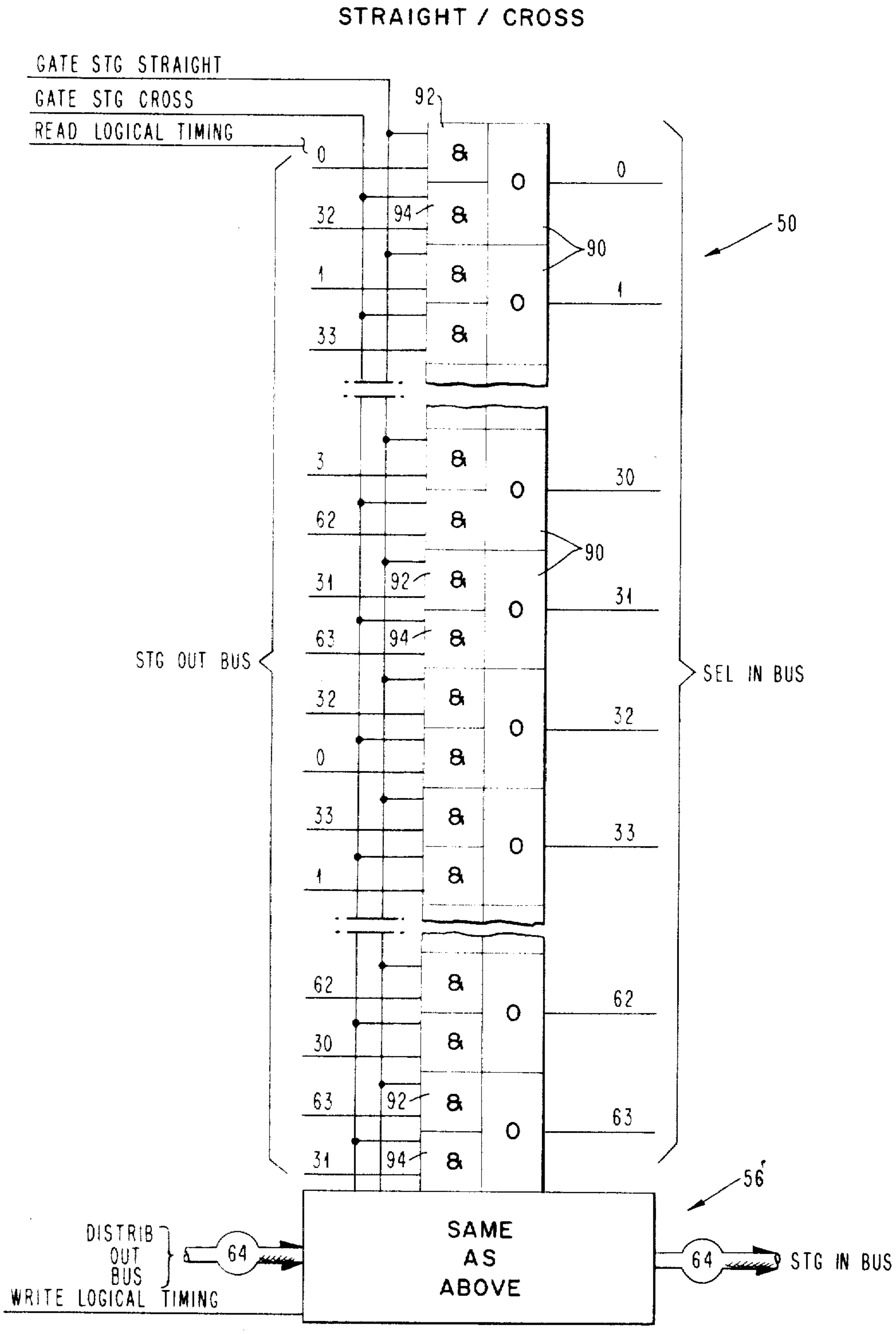
Figure 16:
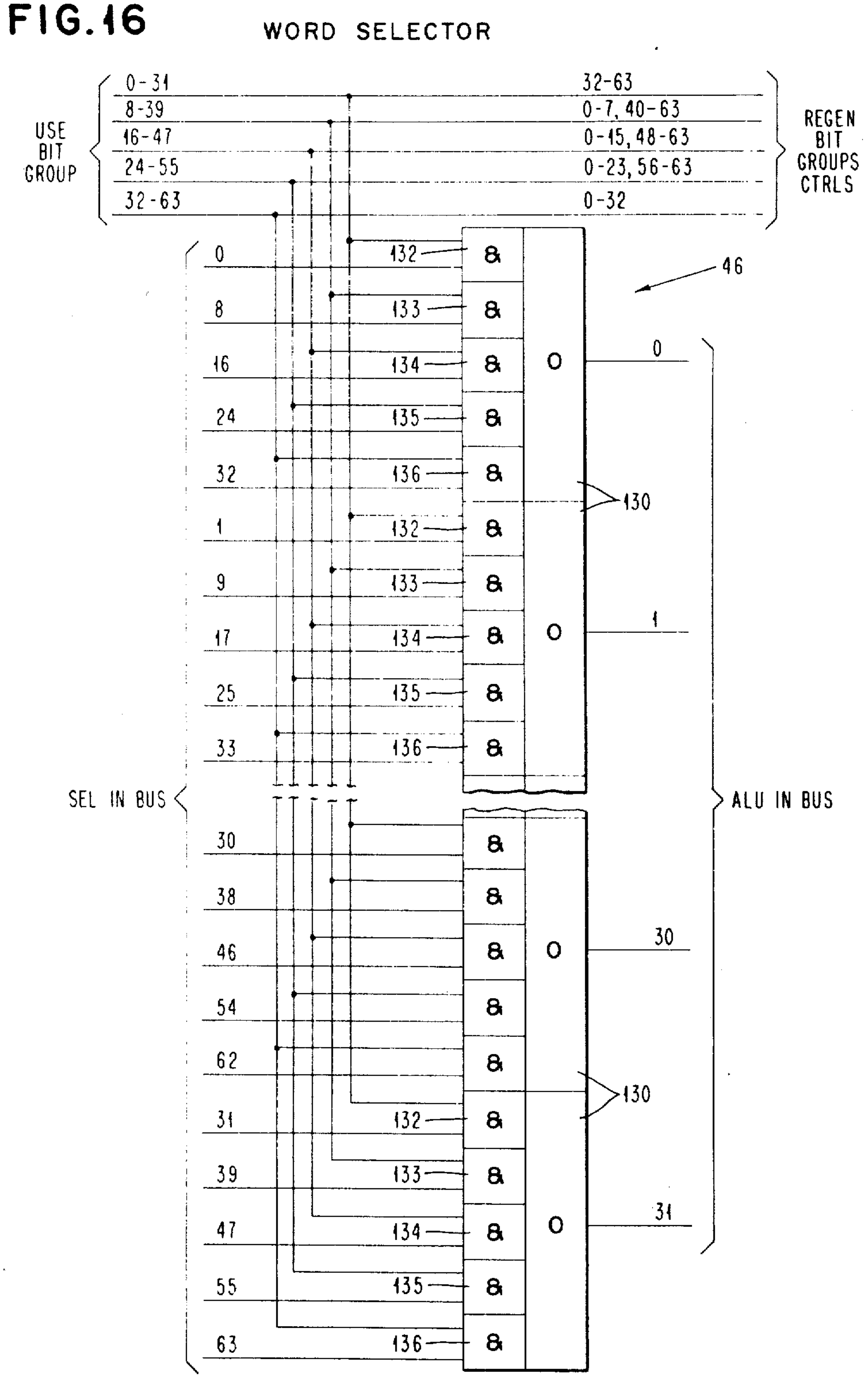
Figure 17:
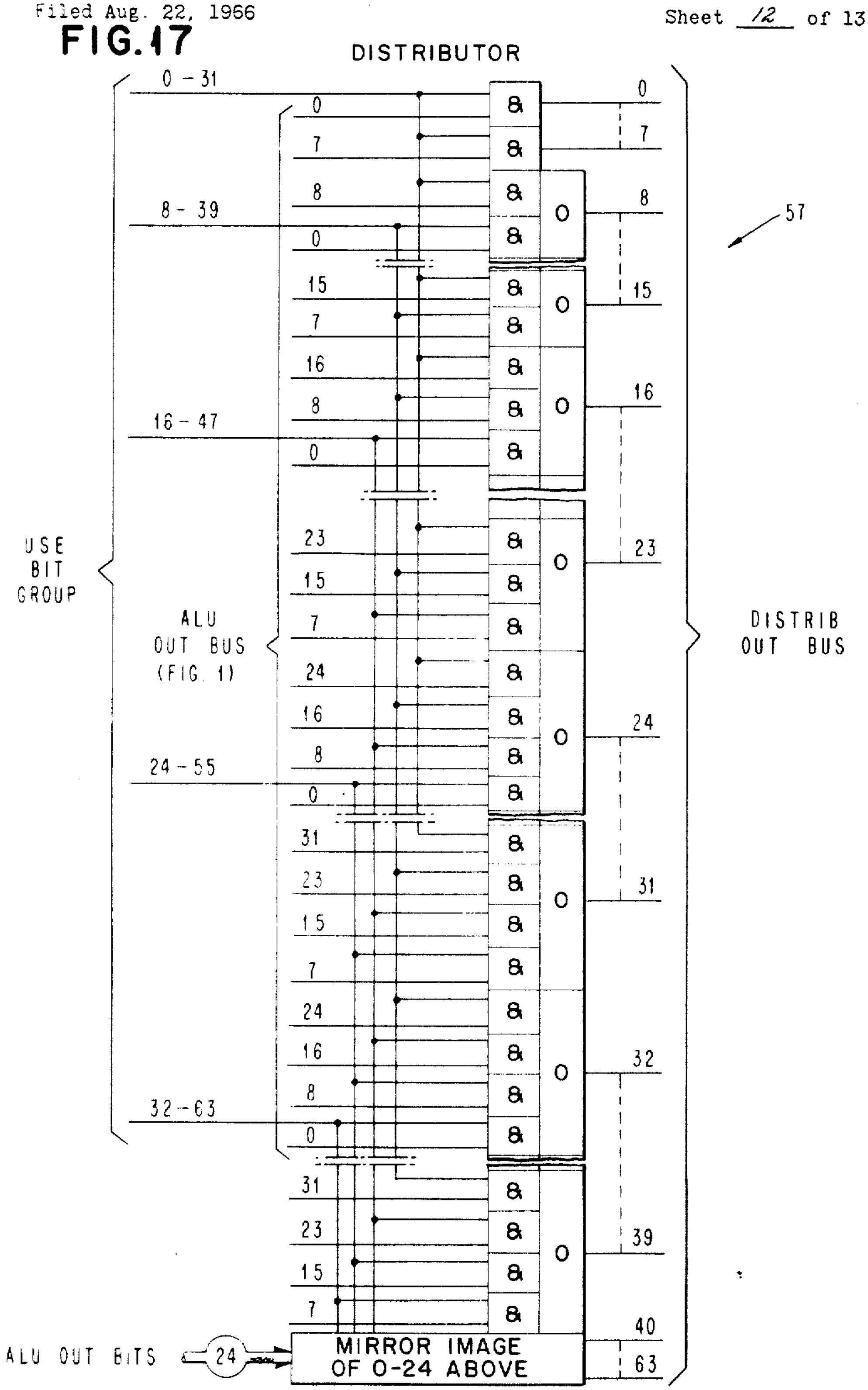
Figure 18:
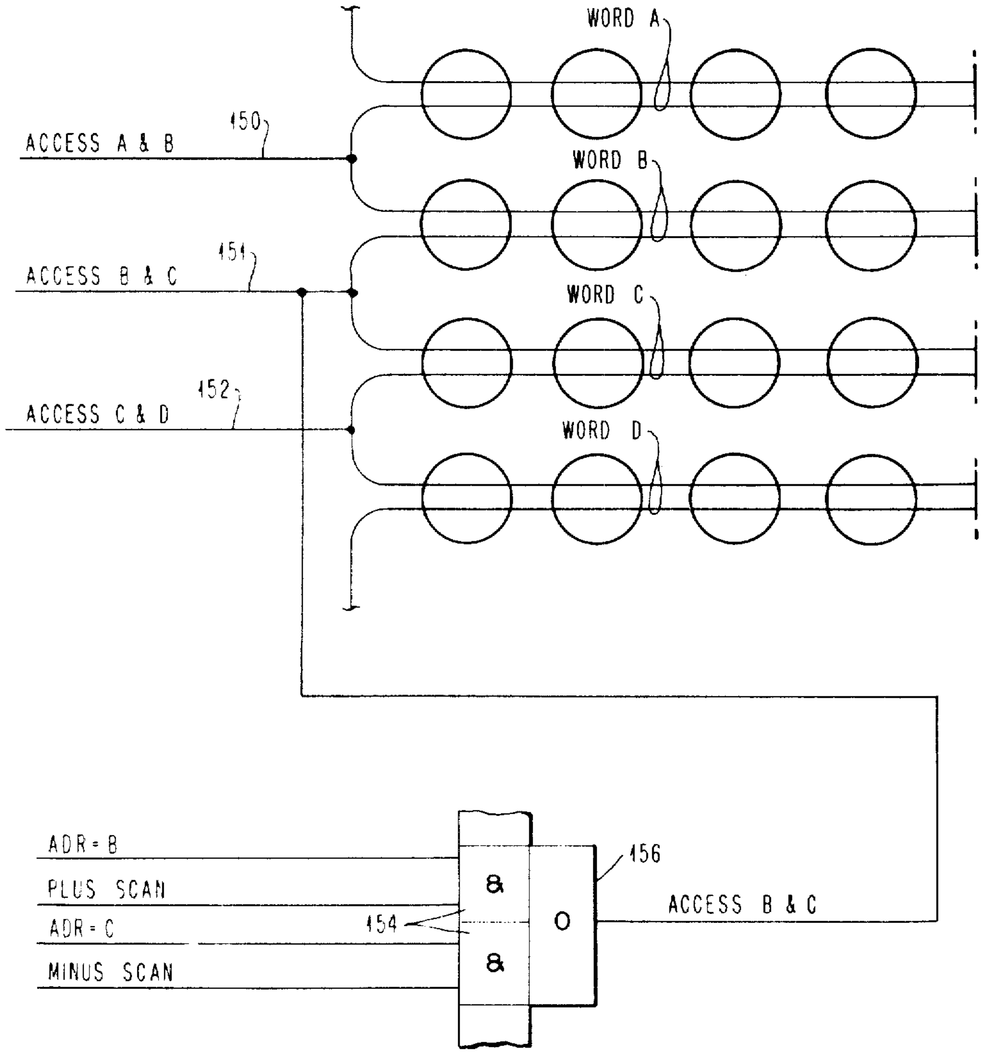

FIGS. 8*a*–8*f* are a series of illustrations depicting data word selection in accordance with a basic embodiment of the present invention set forth in FIGS. 5 and 6;

FIG. 9 is an illustration of storage locations in accordance with an improved embodiment of the present invention;

FIG. 10 is an illustration of the data content of a portion of a pair of storage units adjusted as illustrated in FIG. 9;

FIGS. 11*a*–11*f* are a series of illustrations of data word selection in the adjusted storage apparatus of FIGS. 9 and 10;

FIG. 12 is a schematic block diagram of a shifting and straight/cross control device for use in the embodiment of FIG. 1;

FIG. 13 is a simplified schematic block diagram, partially broken away, of an address shifting apparatus for utilization in the embodiment of FIG. 1;

FIG. 14 is a simplified schematic block diagram, partially broken away, of straight/cross data flow apparatus for use in the embodiment of FIG. 1;

FIG. 15 is a schematic block diagram of a word select decoder for use in the circuit of FIG. 1 in the control of the circuit of FIG. 16;

FIG. 16 is a partially broken away schematic block diagram of a word selector for use in the embodiment of FIG. 1;

FIG. 17 is a simplified, partially broken away schematic block diagram of a distributor for distributing words within the embodiment of FIG. 1;

FIG. 18 is a simplified diagrammatic illustration of a further embodiment of the present invention.

Referring now to FIG. 1, a storage device 20 is shown, for example only, as comprising a plurality of independent even storage units 22 as well as a plurality of odd storage units 24. All of the storage units 22, 24 of the storage apparatus 20 are accessed in response to addressing signals provided over related address busses 26, 28 from an address shifter 30 (shown in detail in FIG. 13). The address shifter in turn is responsive to address bits provided over an address bus 32 from an instruction and control unit 34 (which is shown in simplest form, for illustrative purposes only, in FIG. 1). The address shifter 30 is also responsive to control signals 35 provided by the shifting and straight/cross control circuit 36 (shown in detail in FIG. 12). This circuit is responsive to address bit 21 and to plus and minus scan lines 38, 40. The units 30, 36 control operating the storage devices in such a manner that, without regard to the address of a particular data bit group, two storage words will be provided to insure that the addressed data bit group and an additional three data bit group (in the present example) will be provided to an ALU 42. The ALU 42 receives data over an ALU IN BUS 44 from the word selector 46 (shown in detail in FIG. 16). The word selector 46 in turn receives twice as many data bits over a SEL IN BUS 48 from a straight/cross circuit 50. The straight/cross circuit 50 receives two data words of four data groups (or bytes) each over the STG BUS OUT 52, and passes them in the same order in which they are received (the data word from an even address being on the left and the data word from an odd address being on the right) or transposes the data words (so as to present the odd on the left and the even word on the right); this is achieved under the control of straight/cross control lines 54 which are provided by the shifting and straight/cross control 36. The straight/cross control lines 54 are also supplied to an additional straight/cross unit 56, which unit receives data from a distributor over a bus 59 and supplies data to the STG BUS IN 60 for storage within the storage apparatus 20. The distributor 57 and the word selector 46 respond to five word selection signal lines 58 which are provided by a word select decoder 60. The word select decoder is responsive to address bit lines 32 which relate to bits 22 and 23 (the low order bits of an address, which specify the particular 8-bit byte within a 32-bit word) as well as to the plus and minus scan lines 38, 40.

The ALU 42 is shown very simply in FIG. 1, and illustrates merely any useful utilization device such as the arithmetic and logic unit portion of a data processing system: this could of course include input/output, key indication, or control equipment, and any other data-responsive apparatus. The output of the ALU is transferred over an ALU OUT BUS 62 to the distributor 57.

The operation, briefly, of the circuit of FIG. 1 begins with a specific operation to be performed, together with addresses of one or more operands involved in the operation, being specified by the instruction and control unit 34. The operation may determine (in some systems) whether the storage apparatus is to be accessed in successively higher-addressed storage locations (plus scan, such as from address to 2, to 3, to 4, etc.) or whether successively lower-addressed locations (7, 6. 5, etc.) are to be accessed in turn (minus scan); in other systems, only one scan direction may be provided. The address of the first operand involved in the operation is supplied over the address bus 32 to the word select decoder 60, the shifting and straight/cross control 36, and the address shifter 30. These units determine: which two storage devices (one of the even units 22 and one of the odd units 24) will be accessed; the relationship of one of them to the other; whether their outputs can be passed straight or must be transposed in the straight/cross circuits 50; and, taking into account the first byte which is addressed, and the direction in which the operation is to proceed, which four out of the eight possible bytes are to be selected by the word selector 46 for application to the ALU 42. When the operation is complete, the ALU will pass the four bytes of results to the distributor 57 which determines where the four bytes came from in the word selector 36, and passes them to appropriate positions of a 64-bit word for application to another straight/cross circuit 56; if the straight/cross circuit 50 transposes the position of the two 32-bit words as they are read out of storage, then the straight/cross circuit 56 will cross them again so as to return them to their original positions such that the even word will return to an even storage and the odd word will return to the odd storage.

It should be noted that the basic invention is not concerned with how many storage units are used, the storage apparatus 20 of FIG. 1 illustrating the use of eight storage units to show that the invention herein is not limited to small-storage applications that can accommodate only two storage units.

Figure 2:
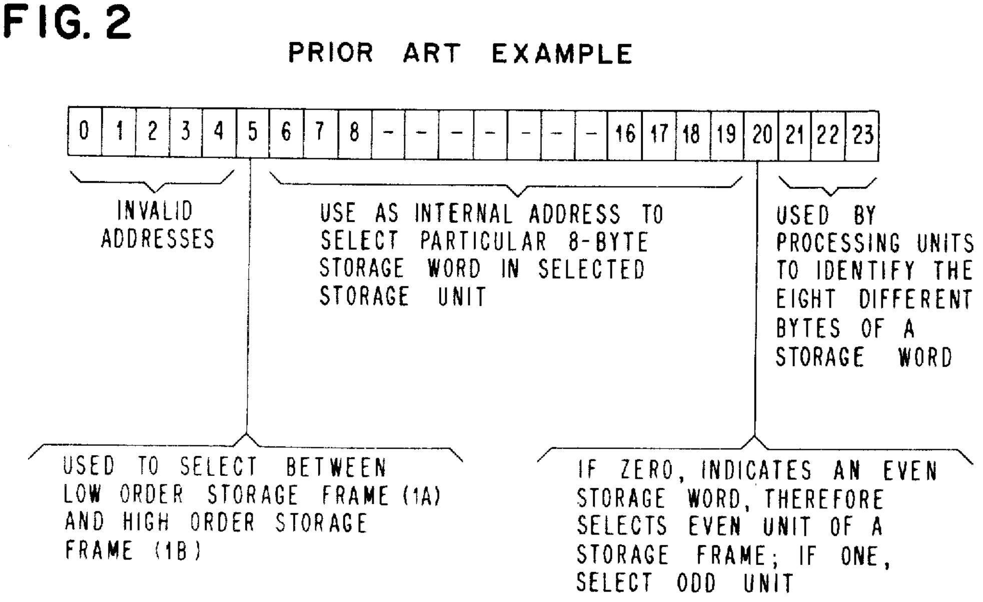
FIG. 2 is a chart illustrating addressing in one large scale, parallel data processing system of the prior art.

Consider now the addressing structure of a large scale, parallel, data processing system which is available in the prior art, as illustrated in FIG. 2. This system is described in a copending application of the same assignee filed by O. L. MacSorley et al., on Apr. 5, 1965, Ser. No. 445.326 now abandoned in favor of continuing application Ser. No. 609,238, filed Jan. 13, 1967. In FIG. 2, nineteen address bits (designated 5 through 23) are provided to completely specify all of the storage locations available within the system. Address bits 0–4 (the highest-ordered address bits) specify storage devices not included in the exemplary prior art system, and are therefore considered to be invalid address bits (which might cause an alarm or other interruption condition). The lowest-ordered address bits (bits 21–23 in the example of FIG. 2) are used to specify eight different 8-bit bytes of a 64-bit storage word. These bits (21–23) are not used in the storage apparatus as such, but rather are used in the ALU or other utilization apparatus to select from among the eight different bytes which are presented thereto by the storage apparatus. The next-lowest bit of the address (bit 20) is used to designate even and odd storage words: in even storage words 0, 2, 4, 8 . . . 16,040, 16,042, 16,044) bit 20 is a ZERO, which may otherwise be referred to as the presence of the complement of bit 20, called NOT 20; on the other hand, odd addresses (1, 2, 3 . . . 16,041, 16,043) all have bit 20 present, which is also designated as bit 20 being a ONE. In the prior art exemplary system, bit 20 is used to select the even or odd half of a selected storage frame, even-addressed words being in one half of the frame, and odd-addressed words being in the other half of the frame. Bits 6–19 are used in said exemplary system as internal address bits within any half of a storage frame, and designate a particular, 64-bit storage word to be referenced by the current address. Bit 5 of the example selects between a high-order frame and a low-order frame.

Figure 3:
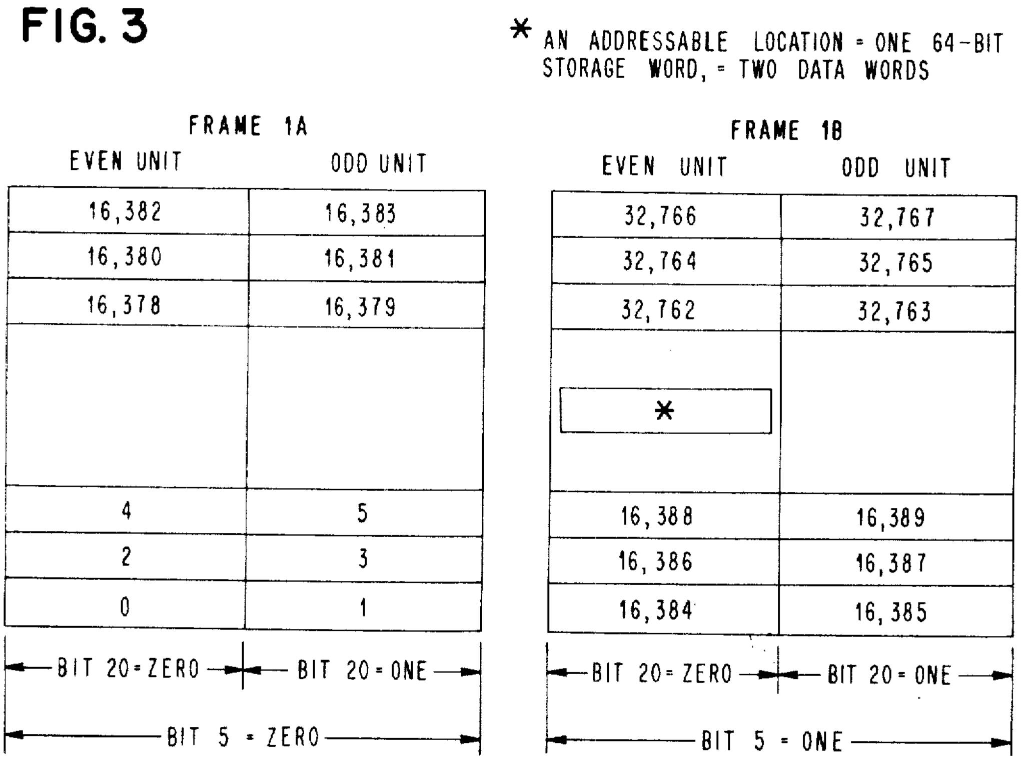
FIG. 3 is an illustration of storage location arrangements within the data processing system referred to in FIG. 2.

An exemplary configuration of a storage unit, which is the storage configuration of said exemplary prior art system, is illustrated in FIG. 3, which also illustrates the address bit significance of the example of FIG. 2 as applied to the storage units. This system has 32,768 storage locations arranged in two frames, each frame having independent odd and even units, each location capable of storing a 64-bit word; the odd and even units are operable in an interleaved fashion, so that sequential storage locations in memory can be taken from alternately-accessed odd and even storage units. This permits starting one storage unit, and before its cycle is completed, starting another storage unit, etc.; then the first unit will finish its cycle followed by the second unit finishing its cycle, etc. This permits operating the storage units at a rate which is effectively twice their own inherent rates of speed, so that, when a storage unit has a one micro-second cycle, data may be supplied by a pair of such storage units which are operated in an interleaved fashion on a one-half micro-second cyclic basis. The storage arrangement of FIG. 3 is utilized as an example of the prior art, to illustrate the manner in which interleaved (even/odd) storage arrangements have been utilized in the prior art. Notice that in the lower-ordered frame (frame 1A) the even storage unit contains storage locations having addresses 0, 2, 4 . . . 16,382; the odd storage unit contains addresses 1, 3, 5 . . . 16,383. The high order storage frame contains storage locations with higher addresses, the even units having addresses 16,384–32,766 and the odd unit containing storage locations with addresses 16,385–32,767. In said exemplary system, if storage unit 1A EVEN (1AE) is first operated, the next unit to be operated might be either storage unit 1A (ODD (1AO) or storage unit 1B ODD (1BO). In other words, each of the storage units (1AE, 1AO, 1BE, 1BO) are independently operable.

In simplified terms, for illustrative purposes, a first embodiment of the present invention relates to the ability of a data processing system to operate two units simultaneously (not interleaved) in such a fashion that any one operated unit may provide a first address and another unit, which is operated simultaneously therewith, may provide either a next-higher address or a next-lower address. Thus two storage units will produce or store two words of data in a single accessing operation; it is still possible that another two storage units may be operated in an interleaved fashion with the first two storage units.

Figure 4:
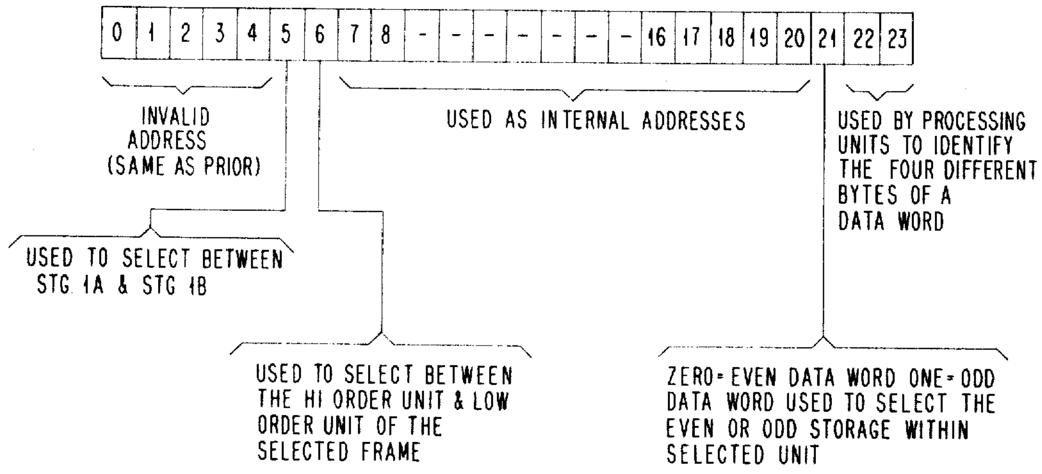
FIG. 4 is a chart illustrating addressing as employed in a basic embodiment of the present invention as illustrated in FIG. 1.

An example of the simple premise of the first embodiment is shown in FIG. 5, and the addressing therefore is illustrated in FIG. 4. FIGS. 4 and 5 contemplate the same storage system as FIGS. 2 and 3 with the exception of the fact that each storage unit is replaced by two storage units, the two units each being one half the size of the original storage unit; thus, storage unit 1AE now becomes the low unit of storage frame 1A, it comprising both an even storage and an odd storage as shown in FIG. 5.

Referring to FIG. 4, since each storage unit is one half the size of the original units, the storage word is one half as large: that is, a 32-bit storage word is utilized in FIG. 5 in contrast with the 64-bit storage word used in FIG. 3. Thus there are only four 8-bit bytes in an addressable storage word, so that only the two lowest-ordered bits of an address (at the right of FIG. 4) are required to identify the four different bytes of a data word. Bit 21 of the address, in the basic embodiment of the present invention (illustrated in FIGS. 4 and 5), is utilized to select between the even and odd storages of any storage unit. This contrasts with bit 20 being used in the example of FIGS. 2 and 3 to choose between the even and odd units of a storage frame. Bits 7 through 20 in the present example are used as internal addresses to specify any one of the 8,192 storage locations in a storage unit. Bits 5 and 6 of the address are utilized to pick the low unit or the high unit of a particular storage frame, within which unit bit 21 will pick either the even or the odd device. As in the example of FIGS. 2 and 3, the example of FIGS. 4 and 5 does not utilize bits 0–4, and these are therefore recognized as specifying invalid addresses which will cause an alarm condition.

In utilizing the basic embodiment of the present invention as illustrated in FIG. 5, every storage accessing operation will cause accessing of two storage words, so that sixty-four bits of data will be involved in each operation; this is the same as in the example of FIG. 3; the only difference is that instead of merely being able to specify a single, completely defined 64-bit storage word (as in FIG. 3), the pair of storage words in accordance with the present invention may vary so that any particular 32-bit storage word may be referenced with either the next higher-addressed storage word or the next lower-addressed storage word. This is illustrated in FIG. 5 with respect to particular storage locations. For instance, storage location 31,156 may be referenced concurrently with storage location 31,157, which would be the case where the address includes storage location 31,156, and where the scanning through the storage unit is in a positive direction so that successively higher-addressed storage locations are accessed (plus scan). This is accomplished automatically by using bits 5–20 of the address applied to both the even and odd storages of the high unit of frame 1A. A slightly different situation exists if the address were to specify, for instance, storage location 27,149; in this case, if a positive scanning of storage is required, the next adjacent storage location is 27,150. In order to get storage location 27,150 in response to the address for storage location 27,149, it is necessary to shift the lowest-ordered bit of the internal address (bit 20) so as to specify a storage location within the even storage of the high unit of frame 1A which is one storage location higher than the one which bears the same internal address (bits 5–20) as storage location 27,149.

Additional examples are shown in the high unit of frame 1B. In these examples, it is assumed that successively lower-addressed storage locations are to be accessed (minus scan). Thus, if storage location 53,283 were addressed, the next location in sequence (in a negative direction) is storage location 53,282. This location can be accessed within the even storage of the high unit by utilizing address bits 5–20 which are identical to address bits 5–20 applied to the odd storage of the high unit so that locations 53,282 and 53,283 will both be provided by the same set of addresses. On the other hand, if the address is for an even storage location, such as location 61,486, then the next sequential storage location is 61,485 (when accessing in a negative direction) so that the address used for the odd storage device must be one lower than the address used for the even storage device in this case.

By comparing the two examples given, it is seen that if a positive scan is used and an even address is specified, then the next higher address can be provided with the same address bits as the addressed storage location; similarly, when in a negative scan, if the address specifies an odd location, then the next lower even location may be accessed by utilizing the same address bits. On the other hand, when in a positive scan and an odd address is specified, then the address bits for the even storage device must specify the next higher location than the address bits for the odd storage device; in a similar fashion when a negative scan is being used and an even address is specified, then the address bits for the odd storage device must specify one storage location lower than the address bits for the even storage device. This situation is summarized in FIG. 7, wherein "E" means even, "O" means odd, "+" means positive scan, and "—" means minus scan. When the address is even and the scan is positive, no shifting of an address is required to reference a storage location adjacent to the addressed storage location, and the same is true where an odd address is specified during a minus scan, as seen in the left of FIG. 7. When an even address is specified in a minus scan, then the odd storage device must be referenced with address bit configuration which is shifted in the negative direction, and the even storage device must have its address shifted in the positive direction in the case where an odd address is specified during a positive scan. This is illustrated under the columns identified as "BASIC" in FIG. 7.

An example of the basic embodiment of the present invention is shown in FIG. 8 with respect to a presumed character content of a portion of the low unit frame 1A as illustrated in FIG. 6. This example assumes a first address of byte 3 (see bottom of FIG. 6) within word 16,042. In other words, address bits 5–20 would specify addresses which include word 16,042 and word 16,043, and bit 21 is a ZERO indicating that it is word 16,042 which is to be referenced in storage. In addition, address bits 22 and 23 will both be ZERO thereby indicating that the lowest-ordered byte (byte 3 of the four bytes within the 32-bit storage word) is the first byte of the operation specified. Thus, in order to process four bytes at a time, byte 3 of word 16,042 will be processed concurrently with three additional bytes, which are found in word 16,042 in the case of a negative scan, and which are found in word 16,043 in a positive scan. It should be noted that, a basic storage operation must be employed in a data processing system, and therefore in response to a given address, certain storage words must be presented for the utilization portion of the system to use. At times, the addressed storage word will contain the four bytes which are to be used in the operation, and there will be no need for the other storage word. However, there are more cases (assuming completely random addressing) wherein the addressed storage word will not contain four related bytes for processing. As an example, considering byte three of word 16,042 as shown in FIG. 6, the letter "l" designates the addressed byte. In the case of a negative scan, byte "l" will be processed with bytes "k," "j," and "i"; but in the case of a positive scan, bytes "m," "n," and "o" must be processed with byte "l". Before it can be known whether or not a complete set of four related bytes is found in a storage word, the byte address must be known and the direction of scan must be known, as just described. Since storage devices are provided with a relatively fixed mode of operation, and are attached to storage data busses which will carry a given number of bits, it is simpler and more reliable to reference storage on an automatic basis, and then, depending upon the byte addressed and the direction of scan, to select those bytes which are presented by storage from among two complete storage words.

Illustrations *a*, *b*, and *c* of FIG. 8 represent the first, second, and third accesses of storage in a positive scan of an example of the basic embodiment of the present invention, within which the first address specifies byte 3 of word 16,042 (as illustrated in FIG. 6). In FIG. 8*a*, since word 16,042 is the first address, and a positive scan is involved, word 16,043 (which contains letters "m"–"p") will also be automatically accessed in storage. Assuming that a fetch operation is involved, this will provide word 16,042 ("i"–"l") in the left side of the straight/cross circuit 50 (FIG. 1) and word 16,043 in the right side of the straight/cross circuit 50. In this particular example, no crossover is required so that the word selector 46 (FIG. 1) receives letters "i" through "l" in the left-hand side and letters "m" through "p" in the right-hand side. Since the byte address is 3, this selects letters "l," "m," "n," and "o" for application to the ALU since these include the addressed byte (byte 3 of word 16,042) and the next three higher-addressed bytes (bytes 0, 1, and 2 of word 16,043).

In the second access of storage (illustrated in FIG. 8*b*) word 16,043 must be referenced (so as to pick up letter "p") and the next higher-addressed storage word (16,044, containing letters "q," "r," "s," and "t") is also automatically accessed. This is achieved by shifting the storage address of the even storage unit by ONE in a positive direction so that storage word 16,044 is automatically provided when referencing storage word 16,043. Notice that mechanism has not been shown herein for advancing the address as successive operations are performed, which advancing may take place in response to circuitry well known in the prior art as illustrated in said previously-identified copending application of MacSorley et al., or in a copending application of the same assignee by Richard S. Carter and Walter W. Welz, Ser. No. 332,648, now U.S. Patent 3,270,325. Advancing of the basic address through successive cycles of operation is no different in the case herein than in said copending applications; the difference here is that whatever address is specified will always automatically cause an additional, adjacent address to be specified in another storage unit. Thus when the basic address of the present example (word 16,042) is specified by the instruction involved, it automatically provides word 16,043; when the second accessing of storage is required, advancing means as in the prior art will cause the instruction unit to now specify word 16,043, and the apparatus in accordance with the present invention will automatically cause this to be accompanied by word 16,044. Thus in FIG. 8*b*, letters "m"–"p" are automatically accompanied by letters "q"–"t" as they are read from storage. In FIG. 8*b*, since the letter "p" must be utilized with the letters "q," "r," and "s," in that order, the straight/cross mechanism 50 (FIG. 1) will transpose the positions of storage word 16,043 and storage word 16,044 so that 16,043 will be placed at the left at the input to the word selector 46 (FIG. 1) and storage word 16,044 will appear at the right of the input to the word selector 46. The word selector then takes into account positive scan plus a byte address of 3 and causes byte three of word 16,043 and bytes 0, 1, and 2 of word 16,044 to be presented at the output of the word selector 46.

Figure 8A:
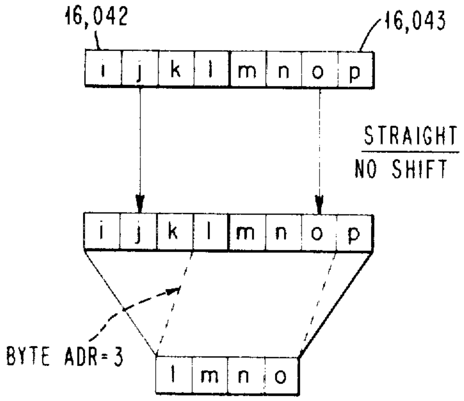
Figure 8D:
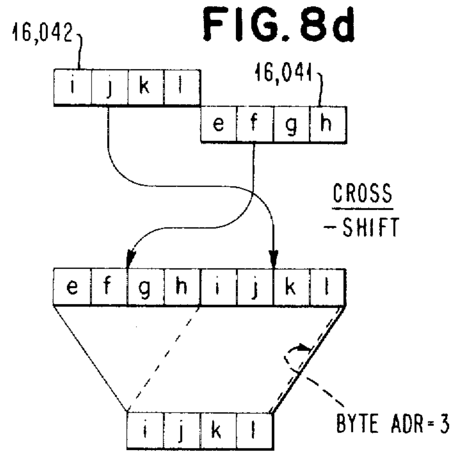
Figure 8B:
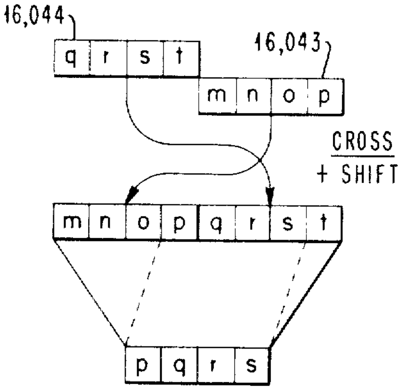
Figure 8E:
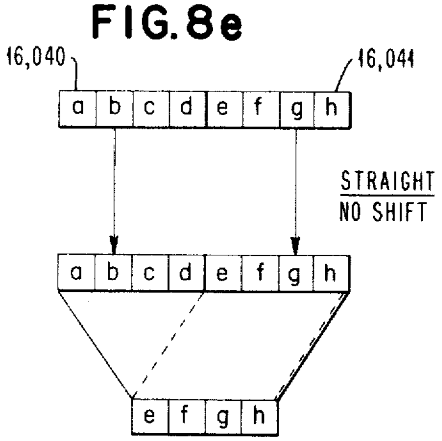
Figure 8C:
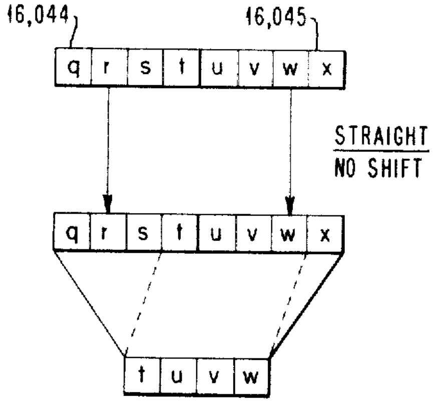

In a third accessing of storage, the situation is identical to the first accessing of storage as can be seen by comparing FIG. 8*c* with FIG. 8*a*. In FIG. 8*c*, word 16,044 is presented so as to provide access to letter "t," and it must be accompanied by word 16,045 so as to present letters "u," "v," and "w." Since these are in the proper relationship, the straight/cross mechanism will pass them to the word selector without transposition and the word selector will extract the right-most byte of word 16,044 and the first three bytes of word 16,045 for presentation to the ALU.

Figure 8F:
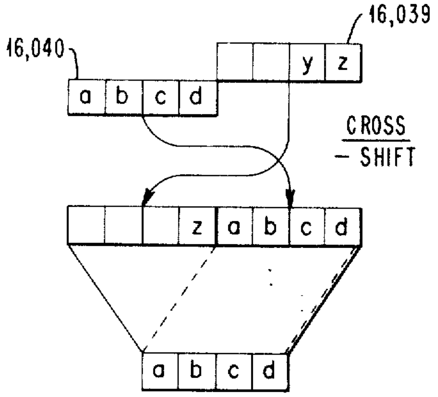

The same basic example for a minus scan is illustrated in FIGS. 8*d*–8*f*. Therein, word 16,042 contains the byte designated with the letter "l," and since a minus scan is involved, this will be utilized with bytes designated "i," "j," and "k." However, as has been descrbied with reference to FIGS. 8*a*–8*c*, the storage device does not know that word 16,042 completes a data word for utilization, and so it presents the next lower storage word (word 16,041) along with word 16,042, automatically, in response to apparatus of the present invention. Since a minus scan is involved, and an even address has been specified, the straight/cross mechanism will transpose the storage words so that, at the input of the word selector 46 (FIG. 1), word 16,042 is at the right and word 16,041 is at the left. The word selector then chooses the entire word 16,042 since it includes byte 3 of that word and the next three lower-addressed bytes ("i"–"l," all together). On the second fetching operation, word 16,041 is specified by the addressing mechanism, and word 16,040 is automatically chosen as the lower-addressed word to be accessed therewith. These are passed without transposition by the straight/cross mechanism 50 to the word selector 46 (FIG. 1). Again, the entire rightmost word of the word selector (word 16,041 in FIG. 8*e*) is selected for application to the ALU. The third operation is similar to the first (as this can be seen by comparing FIG. 8*f* with FIG. 8*d*). In this case word 16,040 is specified and it is automatically accompanied by word 16,039. These are transposed so as to present them in the proper order at the input of the word selector 46 (FIG. 1) and all of word 16,039 is selected for application to the ALU. Notice in FIG. 8 that when the address is even and there is a positive scan, there is no shifting required; when the address is odd and there is a negative scan, there is no shifting required; but that a positive shifting of addresses is required in a plus scan when an odd address is specified; and a negative shifting of addressing is required in a minus scan when an even address is specified. As described hereinbefore, this is summarized in the first four columns of FIG. 7.

The embodiment of the present invention which has been described with reference to FIGS. 4–8 is a complete example of the present invention, which may be summarized as apparatus that provides a stated storage word and the next adjacent storage word (taking into account the direction of scanning of storage words). This will guarantee that a full data word (which in this example equals a 32-bit storage word) is available for processing following each referencing of the storage apparatus, or that a full data word may be stored in a storage operation, without regard to the byte specified for starting the operation, and without regard to the direction in which the successive storage locations are accessed in successive operations.

The embodiment herein utilizes a pair of 32-bit storage words, selected in overlapping sequence, to guarantee 32 bits to a 32-bit data flow. However, the addressing and storage accessing, in the embodiment described in detail herein, actually guarantees 40 bits (5 bytes) since the addressed byte is ALWAYS followed by at least one additional full data word. Therefore, if scanning of storage is accomplished by increasing the address five bytes (instead of four, as herein), a five byte (40-bit) data flow could be used. This would increase the through-put (or processing speed) by 20%, approximately. A greater percentage advantage is realized in a case where a pair of two-byte storage words are accessed, guaranteeing three bytes for processing. It should therefore be understood that the invention in no way relates either to the size of the data flow or storage words or to the relative size between them; the invention herein eliminates the problems of the physical boundary of the storage device.

The basic embodiment of the present invention (FIGS. 4–8) results in the need of being able to shift the addresses in both the minus direction (for an even address during a minus scan) and in the positive direction (for an odd address in a plus scan). An improved embodiment of the present invention contemplates shifting all of the odd storage unit addresses so that whenever no shifting of addresses is required in the basic embodiment, a positive shift will be used, and when a negative shift is required of the odd storage addressed in the basic embodiment, no shifting will be used in the improved embodiment. This is illustrated in the last two columns of FIG. 7. In order to achieve this, there is a transposition of all addresses from the original physical locations shown in FIG. 5 such that they are all in a next-higher storage locations as illustrated in FIG. 9. In FIG. 9 all the even storage units are addressed the same as the storage units of FIG. 5 (the basic embodiment described hereinbefore). However, all of the odd storage units are effectively addressed in a different manner than the similar units of FIG. 5. This is because, in the improvement of a second embodiment of the present invention, any address being applied to an odd storage unit is automatically shifted upwardly, except in the case where, if the basic embodiment were used, a negative shift would have taken place; in this latter situation, no positive shift in fact occurs so that the net effect is to access an odd address, which is one address lower than the specified even address. Thus, the actual first physical storage location in the lowest-ordered odd storage device is the highest-addressed storage location, since any address which might be applied to the odd storage units, is incremented so that the first address available (address Number 1) appears in the second storage location of the lowest-ordered, odd storage device. Similarly, all addresses appear in the next higher storage location from similar addresses of FIG. 5 in all of the odd storage devices. High-order address wrap-around renders the highest address (65,555) the actual address that, after being automatically shifted, will reach physical address Number 1.

Examples of this improvement are illustrated in FIG. 9 for comparison with similar examples in FIG. 5. Thus in a plus scan, if address 31,156 is specified, in order to get address 31,157 (which appears in a higher location) the address is automatically shifted so as to provide word 31,157. On the other hand, when an odd address is specified, such as word 27,149, no shift is required in contrast to the requirement of a positive shift as shown in FIG. 5. This is because the location was automatically shifted when the storage was first loaded. Similarly in a minus scan, if an even address (word 61,486) is specified, the next lower word (61,485) is available without a shift as shown at the right of FIG. 9. This contrasts with the requirement of a negative shift as illustrated in FIG. 5. In the case of a minus scan where the starting address is odd (word 53,283) it appears as if a negative shift is required to reach word 53,282; this is not so, due to the fact that the basic addressing structure of address bits 5–19 are identical for word 53,282 and word 53,283, the difference being bit 20 only.

It is important to note that, except for bit 21 (which chooses between an even and an odd storage unit as the addressed unit), the address bit components for an even address are identical with the address bit components for the next higher-ordered odd address. In other words, they differ only by bit 21 which signifies the address as being odd or even. But bit 21 is not used within the storage apparatus; it is merely in the control circuits (the shifting and straight/cross control 36 which is illustrated briefly in FIG. 1 and described in detail hereinafter). Therefore, there is no significance to the odd or even nature of an address within the storage units themselves (the even unit receives the same address components as the odd unit), the differences being within the controls and within the particular even or odd units chosen.

In the adjusted storage arrangement of FIG. 9, in the case of a minus scan, the shift is applied to the odd location in the case where the odd location is addressed, rather than applying the shift to the even location; in other words, when the shift is applied to the non-addressed storage unit in the case of a plus scan, it is applied to the addressed storage unit in the case of a minus scan. Thus, in the case of a minus scan (at the right of FIG. 9), if the addressed word is 53,283, address bits for word 53,282 are applied to both the even and the odd storage unit, but the address bits are caused to be shifted one bit (at the bit 20 level) automatically as the address bits are transferred to the odd storage unit (in a manner to be described in detail hereinafter).

The effect of the storage arrangement shown in FIG. 9 is further illustrated in FIG. 10, which is an illustration of a portion of the even and odd storage devices of the low-order unit of Frame 1A, similar to FIG. 6. By comparing FIG. 10 and FIG. 6, it can be seen that the effect of automatically shifting all addresses as they are applied to the odd storage unit (except in the case where an effective negative shift is desired), is to transpose all of the characters in the odd storage unit from their nominal physical storage locations to a next-higher addressed physical storage location. However, although the storage device itself responds to a higher address (because the address has been shifted) the address designation of the storage location is the original designation since the computer utilizes given addresses to reach storage locations, and the shifting effect is felt only within the odd storage devices themselves. Thus, in FIG. 6, word 16,041 is within a storage location of an odd storage device which corresponds with the storage location of an even storage device containing word 16,040. In contrast, as shown in FIG. 10, word 16,041 is within a storage location of the odd storage unit which corresponds with the storage location of the even unit containing word 16,042. The external addresses (the addresses actually specified by the computer) are still commensurate: that is, the internal address bits supplied by the computer to specify word 16,042 are identical to the address bits supplied by the computer to specify word 16,043; it is only as these address bits are applied to the odd storage unit that they are shifted so as to reach a next-higher storage location within the odd storage unit.

For further exemplification of the adjusted addressing in accordance with the second embodiment of the present invention, FIG. 11 includes several illustrations which are similar to those in FIG. 8. In order to illustrate the different effects of a variation in byte address, FIG. 11 assumes an example wherein the first address is byte 2 of word 16,042 (contrasted with byte 3 thereof in FIG. 8). In FIG. 11*a*, which illustrates the first access of a positive scan with the adjustment of the improved embodiment, word 16,042 and word 16,043 are automatically accessed, and since these are in correct alignment to get byte 2 of word 16,042 ("k") together with the next three higher-ordered bytes ("l," "m," "n") they are passed, by the straight/cross circuit 50 in FIG. 1, without transposition, to the input of the word selector 46. Since byte 2 is specified in a positive scan, the bytes designed "k," "l," "m," and "n" are selected for application to the ALU.

Figure 11A:
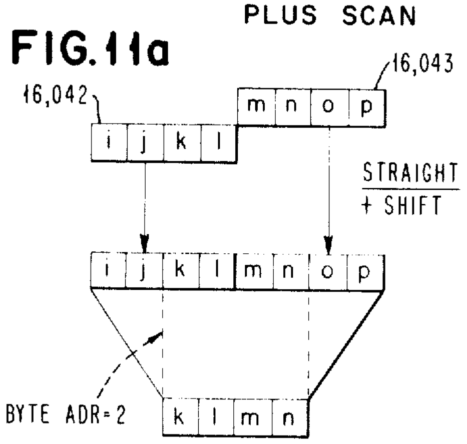
Figure 11D:
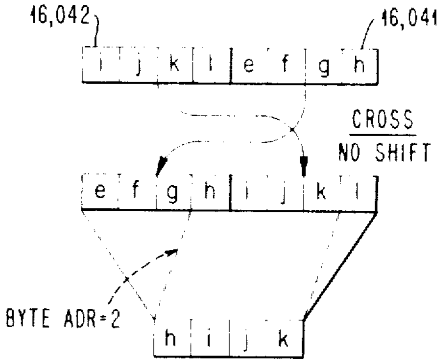
Figure 11B:
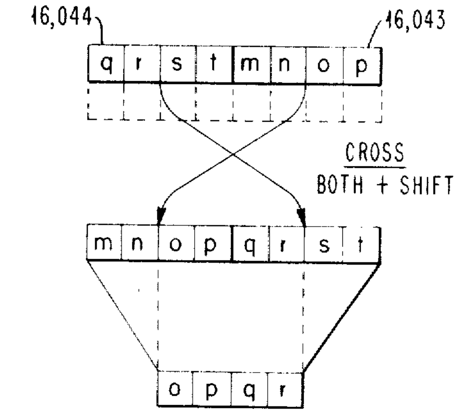

In the second accessing of storage in this example (as shown in FIG. 11*b*), the next address is for word 16,043. However, in order to get the next word to accompany word 16,043, it is necessary to access word 16,044. As described hereinbefore, the basic address components applied to the storage units themselves do not take into account the oddness or evenness of the address, so that the address components in FIG. 11*b* are the same as for FIG. 11*a*: that is, the computer sends address components which equal word 16,042 together with a bit 21 which now indicates that an odd address is being specified. These address components however are to be shifted properly, in accordance with the examples given herein, before application to the storage units. Since the odd storage unit must be shifted (in order to reach word 16,043 in its displaced location), and since word 16,044 must be reached in order to accompany word 16,043, both the odd and the even storage locations receive a positive shift of the address components in this one case. As seen in FIG. 11*b*, the straight/cross mechanism will transpose these so as to get them in the correct order to permit the word selector 46 (FIG. 1) to select the bytes containing letters "o," "p," "q," "r."

Figure 11E:
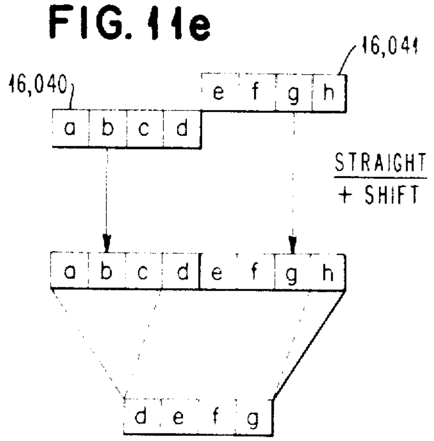
Figure 11C:
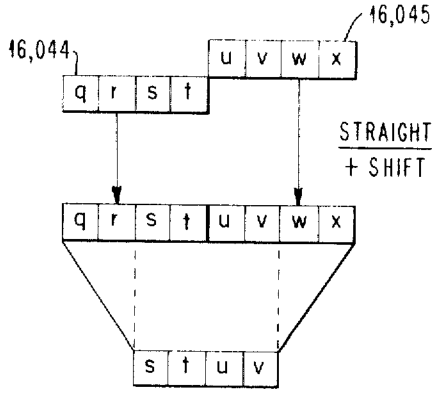

In a third accessing of a positive scan as illustrated in FIG. 11*c*, the situation is the same as in FIG. 11*a*. For the third access of storage, the computer has advanced the address to specify word 16,044, which contains the basic address components for words 16,044 and 16,045. Therefore, only the normal shifting of address bits for the odd storage unit (in second embodiment) is required.

Figure 11F:
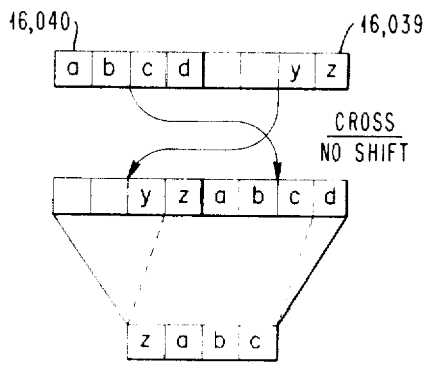

Minus scan examples are shown in FIG. 11*d* through FIG. 11*f*. In FIG. 11*d*, the first address is again byte 2 of word 16,042. This must be accompanied by word 16,041 in order to ensure that at least four bytes may be extracted from amongst the two words starting with byte 2 of word 16,042. Therefore, the straight/cross mechanism must transpose these to get them into the right order as they are applied to the word selector 46. In this case, since a minus scan is involved, the letter "k" must be accompanied by the letters "j," "i," and "h"; therefore, the byte selector selects a different group of bytes than it does in the case of the positive scan in FIGS. 11*a*–11*c*. Notice that word 16,041 is reached in FIG. 11*d* by not shifting the address components as they are applied to the odd storage unit. In view of the fact that all addresses are shifted in the storage unit, failing to shift them in the case shown in FIG. 11*d* permits automatically accessing a storage location which is odd and which bears an address that is one less than the even address. It is this characteristic which is the purpose of the improvement in the further embodiment illustrated in FIGS. 8–11, and for which detailed hardware is shown in FIGS. 12–17: the ability to effectively have a negative shift without requiring actual negative shifting of a storage address. This permits having but a single address shifting device, which is included in the shifting and straight/cross control 36 and the address shifter 30, illustrated briefly in FIG. 1.

In the second accessing of a minus scan in the adjusted example of FIG. 11*e*, the computer has now advanced the address in a negative direction so as to specify the address of word 16,041; as before described, this includes the same address components as word 16,040, the even and oddness being used only in the controller. Therefore word 16,040 may be automatically accessed without any shifting concurrently with the access of word 16,041. This provides two words in proper relationship so that the straight/cross circuit 50 need not transpose the bits before application to the word selector 46.

The third access in the minus scan (shown in FIG. 11*f*) is similar to the first (FIG. 11*d*), which provides components from word 16,040 and word 16,039, transposed by the straight/cross circuit 50, from which the bytes containing letters "z," "a," "b," and "c" are extracted by the word selector 46.

It should be understood that the particular embodiment of the invention illustrated in FIGS. 9–11 is concerned with ELIMINATING the need for shifting of address components in BOTH a positive AND negative direction, and is fully consistent with the basic embodiment shown in FIGS. 4–6. For illustrative purposes, however, FIGS. 12–17 include details of the hardware shown in FIG. 1 for the improved embodiment illustrated in FIGS. 9–11, rather than for the basic embodiment of FIGS. 4–6.

Referring now to FIG. 12, in the light of FIG. 11, a shifting and straight/cross control is shown to provide shifting control over the address components supplied to the even and odd storage units, independently, as well as a pair of control lines for controlling the straight/cross circuits 50, 56. The example of FIG. 11 illustrates when address shifting is to be provided, as summarized in the two right-most columns of FIG. 7. Thus, the even storage unit is to be supplied with unshifted address components except in the case where the address is odd (the presence of bit 21) during a plus scan. This case is taken care of by an AND circuit 70. In all other cases, the address components are to be supplied to the even storage unit without shifting, which is accounted for by an inverter 72.

By referring to FIG. 7, it is seen that the only case when the address components for the odd storage units are not to be shifted is the case where the address is even (not address bit 21) during a minus scan. This case is taken care of by an AND circuit 74. In all other cases a positive shift of the address applied to the odd storage unit is provided for by an inverter 76. Notice in FIG. 11 and FIG. 7, that whenever the positive shift is utilized on the odd storage unit alone, the storage words are passed by straight/cross mechanism without transposition (straight). On the other hand, whenever there is no shifting to either storage device, or both are shifted, then the straight/cross mechanism must transpose the position of the storage words (cross). Restated, the straight/cross mechanism should be operated straight whenever there is a shift of the odd address unless there is also a shift of the even address, which is accommodated by an exclusive OR circuit 78. Similarly, whenever there is no shift (AND circuit 80) or both shifts (AND circuit 82), then an OR circuit 84 will provide a signal to cause the straight/cross mechanisms 50, 56 to transpose, or cross, the data words.

The shift signals generated at the top of FIG. 12 are applied to FIG. 13 to select either an incremented or a non-incremented address, independently, for each of the even and odd storage unit sets. The shifting of the address bits is actually accomplished by an incrementer of any well-known type, such as the one shown in FIG. 14 et seq. of the exemplary prior art system in said copending application to MacSorley et al., adapted so as to apply bits 5–20 thereto and to add a bit automatically to the lowest-ordered bit position. The address bits for the even storage are provided by a plurality of OR circuits 84, each of which is fed by a corresponding one of a pair of AND circuit sets 86, 88. The AND circuits 86 are utilized when shifting is required so as to select the output of the incrementer for application to the even storage unit, and the AND circuits 88 are operated when no shifting is require for the even storage. Similar circuitry is required for the odd storage unit, which has been eliminated from FIG. 13 for simplicity.

The straight and cross control signals generated at the bottom of FIG. 12 are applied to the straight/cross circuits 50, 56 (FIG. 1) which are illustrated in detail in FIG. 14. It should be noted that all of the circuitry shown herein is simplified by the elimination of logic and timing (or combination) control signals which are required in any given application of the present embodiment, as is illustrated by a line called READ LOGICAL TIMING which is shown in FIG. 14 merely as being exemplary of a certain type of timing which could be applied to all of the AND circuits in FIG. 14 to control the operation thereof. In FIG. 14, the selector IN bus is fed by a plurality of OR circuits 90 each of which responds to a corresponding pair of AND circuits 92, 94. Each of the AND circuits 92 is operative when the data words are to be passed through the straight/cross circuit without transposition, so as to present bits 0–31 (which equals an even storage unit output of the storage device 20) to bits 0–31 of the selector IN bus, at the same time as presenting bits 32–63 (representing the output of the odd storage unit) to bits 32–63 (the right hand data word) at the input to the selector. This is clarified with reference to the bottom of FIG. 10 wherein the output of the even storage unit is designated as containing bits 0–31, and the output of the odd storage unit is designated as containing bits 32–63, the input to the word selector 46 (FIG. 1) and the output of the distributor 57 (FIG. 1) being designated 0–63, from left to right. The AND circuits 94 in FIG. 14 are operative to transpose the two data words as they pass through the straight/cross mechanism by providing bits 32–63 of the storage output to bits 0–31 of the selector input, and bits 0–31 of the storage output to bits 32–63 of the selector input.

Control of word selection, both in the word selector 46 and in the distributor 57 (FIG. 1) is provided by five control lines which are energized by logical circuitry in the word select decoder of FIG. 15. The word select decoder takes into account the direction of scan and the original byte address to determine which of the bytes, or which group of thirty-two data bits, are to be selected for use by the ALU, and which are to be selected to have the ALU output applied thereto in the distributor 57. Examination of FIG. 11 illustrates that whenever a positive scan is involved, a byte address of 0 (the left-most byte of a data word) calls for extracting the entire data word; if the byte address is 1, then the last three bytes of the left data word and the first byte of the right data word are to be extracted; when the byte address is 2, two bytes are selected from each data word, and a byte address of 3 calls for the right most byte of the left data word to be selected with the three left-hand bytes of the right data word. Thus, in FIG. 15, a plus scan will cause an AND circuit 96 to select bits 0–31 (the entire left hand data word) when a byte address of 0 is specified by an AND circuit 98 in response to both of the two low-order address bits (22, 23) being ZEROES (designated also as being NOT 22, NOT 23). Similarly, if a byte address of 1 is indicated by an AND circuit 100, then an AND circuit 102 will cause an OR circuit 104 to select bits 8–39 which include the three right-hand bytes of the left-hand data word and the left-most byte of the right-hand data word. When the byte address is 2, as indicated by an AND circuit 106, then an AND circuit 108 will cause an OR circuit 110 to select bits 16–47 which includes the right-most two bytes of the left-hand data word and the left-most two bytes of the right-hand data word. When a byte address of 3 is designated by an AND circuit 112, then an AND circuit 114 will cause an OR circuit 116 to designate bits 24–55 which include the right-most byte of the left-hand data word together with the three left-most bytes of the right-hand data word.

In the minus scan situation, the operation is similar, but notice that for a given byte address, a different group of bytes is selected. In fact, selection in a minus scan is exactly one byte to the right of selection in a plus scan, for a given byte address. Thus a byte address of 0 in a minus scan causes an AND circuit 118 to operate the OR circuit 104; a byte address of 1 causes an AND circuit 120 to operate the OR circuit 110; a byte address of 2 causes an AND circuit 122 to operate the OR circuit 116; and a byte address of 3 will cause an AND circuit 124 to designate selection of bits 32–63 which comprises the entire right-most data word.

The output of FIG. 15 is applied to the word selector shown in FIG. 16, as well as to the distributor of FIG. 17. These two devices operate in a fashion which is complementary to one another as is illustrated in FIG. 1. At the top of FIG. 16, regeneration control lines are shown for purposes of illustration. In both of the aforesaid copending applications, there is the ability for the storage device to store only certain portions of a storage word, and regenerate other portions of the same storage word during a "store" type storage operation. More specifically, in the aforementioned copending application to MacSorley et al., the mark bit controls may readily be adapted so as to cause regeneration during every "read" or "fetch" type cycle, but to cause selective storing in "store" type operations in response to the output of FIG. 15; in other words, for any bit group designated by FIG. 15; there would be mark lines generated within said MacSorley application; the remainder of the bytes being automatically regenerated in the hardware of said MacSorley application. On the other hand, selective regeneration in said copending application to Carter et al., may be provided by utilization of the regeneration control line shown at the top of FIG. 16.

Within FIG. 16, sixty-four data bit input lines of the selector IN bus (the output of FIG. 14) are selected in response to the five outputs of FIG. 15. These provide thirty-two data bit signals (designated 0–31) on the ALU IN BUS for utilization by the computer in response to a plurality of OR circuits 130, most of which are broken away for simplicity. Each of the OR circuits 130 responds to a set of five AND circuits 132–136, selectively, in dependence upon the particular signal provided at the output of FIG. 15. Thus, if bits 8–39 are to be selected, then the AND circuits 133 will each operate so as to provide these bits to the OR circuits 130, in an obvious manner.

The distributor shown in FIG. 17 operates in somewhat complementary fashion to the operation of the word selector shown in FIG. 16. The circuit in FIG. 17 operates in an obvious manner so as to provide the thirty-two data bits to whichever bits, in a scale of 0–63 from left to right, are chosen in the word selector of FIG. 16. In other words, the distributor of FIG. 17 returns the bits to the positions from which they were taken by the distributor. Any of the other bit positions will be 0, but in accordance with the regeneration and storage considerations described with respect to the top of FIG. 16, it is immaterial whether or not signals appear on the data bit positions which are not included within the groups specified by the output of FIG. 15.

The foregoing description completes the detailed discussion of the circuitry of FIG. 1 as implemented to utilize the improved embodiment (with automatic shifting of the odd storage unit) in accordance with the present invention. It should be noted that this embodiment has been described with respect to the type of computer and storage system illustrated in said copending application of MacSorley et al., but that the size of the data bit groups involved, and the nature of the specific types of operations and the manner in which these operations are performed, do not limit the applicability of the present invention. Any type of computer system having storage units of the fixed-boundary type, may be adapted to have a pair of independently operable storage units so as to provide the overlapping of storage boundaries in accordance herewith, either as described with respect to FIGS. 4–6, or as described with respect to FIGS. 9–11, herein.

As an alternative to the foregoing embodiment (altering addresses on independent storage units), certain applications of the present invention might be found to be implemented to economic advantage by means of a special storage device, wherein a single storage device may have overlapping double word control lines, as is illustrated very briefly in FIG. 18. In FIG. 18 four words ("A," "B," "C," "D") are shown for illustrative purposes, each word being selectable by a pair of word selection lines 150–152 so as to select any one word with either the next higher word or the next lower word. Applying FIG. 18 to the previous addressing examples, each word would comprise thirty-two data bits, so that sixty-four data bits would in fact be read out in response to any of the control lines 150–152. The entire storage structure is not shown in FIG. 18, since only the word-selection control need be varied for application of a given storage device to this embodiment of the present invention. Thus, if line 150 were operated, word "B" may be read out with word "A" (as in a minus scan). On the other hand, if word "B" were specified in a plus scan, then word "B" may be selected along with word "C" by operating line 151 instead. This may be achieved with simple control circuits such as the AND circuits 154 and the OR circuit 156 to be provided for each of the control lines 150–152. It is contemplated that the embodiment illustrated in FIG. 18 would find greater application in storage devices of a unified construction, such as monolithics, thin films, and other unitary storage components. However, the nature of the storage apparatus is not germane to the present invention, and any storage apparatus may be utilized in an embodiment of FIG. 18.

Instead of physically attached wiring as shown in FIG. 17, the several storage words may be selected in pairs as described hereinbefore by utilizing an independent word select line for each word, and selecting them in pairs by AND/OR circuit combinations, similar to that shown in FIG. 17, as is within the skill of the art.

Additional embodiments include all sorts of variations and combinations of the address-shifting embodiments and the word selection embodiments described hereinbefore. For instance, within a storage unit, the actual word selection drive lines may be altered in accordance with the teachings of the invention so as to take a word which has the same internal address as the word specified by the computer in the address, or to take a next-higher or next-lower word. Many other methods will be obvious to those skilled in the art, the one chosen being dependent only on design and cost expediency in a given utilization of the invention.

Instead of the straight/cross circuits 50, 56, and the word selector and distributor, a wrap-around combination circuit such as the gate select mechanism of said MacSorley et al., application could be used. Similar other circuit variations are within the skill of the art.

Although the invention has been shown and described with respect to particular embodiments thereof, various changes and omissions in the form and detail thereof may be made therein without departing from the spirit and the scope of the invention, which is to be limited only as set forth in the following claims.

What is claimed is:

1. In the method of accessing a series of sequentially addressed physically static data storage locations in a series of accessing steps which includes one step for each location to be accessed, each step comprising altering the location designating address used therein so as to specify a storage location next in sequence to the storage location accessed in the immediately preceding step, the improvement which comprises:

accessing, in each step, the storage location specified by the address as well as the storage location next in sequence thereto, whereby all storage locations but the first in said sequence are accessed by two adjacent ones of said steps.

2. The invention of claim 1, wherein:

$n$ addressable units of data are provided in each storage location and said accessing step accesses at least $n+1$ units of useful data.

3. A data processing system, comprising:

a cycling storage apparatus containing a plurality of sequentially-addressed storage locations;

address means for specifying, in each cycle, a current storage location, said address means being operative in a plurality of directions to utilize the contents of said storage locations;

and access means, responsive to said address means in each cycle, for accessing said current location and an overlap location having an address next in said sequence to said current location in the same direction as the direction of utilization of storage location contents.

4. The invention described in claim 3, additionally comprising:

scan means for designating a positive scan or a negative scan, alternatively, in which storage locations that are to be accessed in successive operations have successively higher or lower addresses, respectively, and for causing said address means and said access means to sequence in either a positively-addressed or negatively-addressed direction, respectively.

5. The invention described in claim 4, wherein:

said storage apparatus comprises plural independent storage units, with even-addressed storage locations in sequence within a first storage unit, and odd-addressed storage locations within positions of another storage unit which have internal storage locations identical with an even-addressed location of said first storage unit which is adjacent therto in said sequence;

and wherein said access means is responsive to any current location address for either of said storage units to designate said overlap storage location automatically by generating a corresponding, sequential address for the other of said storage units, respectively.

6. The invention described in claim 3, wherein:

the storage apparatus includes interleaved storage element selecting means responsive to said access means, each of said storage element selecting means disposed to select two adjacent groups of storage elements, each storage element selecting means selecting one storage group of elements comprising one addressable storage word and the elements of the next higher-addressed storage word, such that the elements of any storage word may be selected by either one of two selecting means along with the elements of either one of two adjacent storage words.

7. The invention described in claim 6, additionally comprising:

scan means for designating a positive scan or a negative scan, alternatively, in which storage locations that are to be accessed in successive operations have successively higher or lower addresses, respectively, and for causing said address means and said access means to sequence in either a positively-addressed or negatively-addressed direction, respectively.

8. The invention of claim 6, wherein:

$n$ addressable units of data are provided in each storage location and at least $n+1$ units of useful data are provided by each accessing of storage.

9. The invention of claim 3, wherein:

$n$ addressable units of data are provided in each storage location and at least $n+1$ units of useful data are provided by each accessing of storage.

10. A data processing system, comprising:

a cycling storage apparatus containing a plurality of sequentially-addressed storage locations;

address means for specifying, in each cycle, a current storage location having an address which is next in said sequence to the address of the location specified thereby in the preceding cycle, said address means being operative in a plurality of directions to utilize the contents of said storage locations;

and access means, responsive to said address means in each cycle, for accessing said current location and an overlap location having an address next in said sequence to said current location in the same direction as the direction of utilization of storage location contents.

11. The invention described in claim 10, additionally comprising:

scan means for designating a positive scan or a negative scan, alternatively, in which storage locations that are to be accessed in successive operations have successively higher or lower addresses, respectively, and for causing said address means and said access means to sequence in either a positively-addressed or negatively-addressed direction, respectively.

12. The invention described in claim 11, wherein:

said storage apparatus comprises plural independent storage units, with even-addressed storage locations in sequence within a first storage unit, and odd-addressed storage locations within positions of another storage unit which have internal storage addresses identical with an even-addressed location of said first storage unit which is adjacent thereto in said sequence;

and wherein said access means is responsive to any current location address for either of said storage units to designate said overlap storage location automatically by generating a corresponding, sequential address for the other of said storage units, respectively.

13. The invention described in claim 12, additionally comprising:

shift means to alter the internal address of said current location one address increment to derive the address for said overlap location in any accessing cycle wherein the direction of scan is opposite to the direction in which the addresses of corresponding, adjacent odd and even storage locations are related.

14. The invention of claim 13, wherein:

$n$ addressable units of data are provided in each storage location and at least $n+1$ units of useful data are provided by each accessing of storage.

15. The invention described in claim 14, wherein:

said shift means alters automatically, all of the addresses in one of said even and odd storage units in one direction of scan except in cases where a nominal shifting in the other direction of scan is required.

16. The invention of claim 15 wherein:

$n$ addressable units of data are provided in each storage location and at least $n+1$ units of useful data are provided by each accessing of storage.

17. The invention of claim 10, wherein:

$n$ addressable units of data are provided in each storage location at least $n+1$ units of useful data are provided by each accessing of storage.

18. In the method of accessing a series of sequentially addressed physically static data storage locations in a series of accessing steps which includes one step for each location to be accessed, each step comprising altering the location designating address used therein so as to specify a storage location next in sequence to the storage location accessed in the immediately preceding step, the improvement which comprises:

accessing, in each step, the storage location specified by the address as well as the storage location next in sequence thereto, whereby each accessing of storage results in providing more useful data than is contained in a single storage location.

References Cited

UNITED STATES PATENTS

| | | | |
|---|---|---|---|
| 3,109,162 | 10/1963 | Wolensky | 340—172.5 |
| 3,161,763 | 12/1964 | Glaser | 340—172.5 |
| 3,270,324 | 8/1966 | Meade et al. | 340—172.5 |

ROBERT C. BAILEY, *Primary Examiner.*

HARVEY E. SPRINGBORN, *Assistant Examiner.*